(12) United States Patent
Mamiya et al.

(10) Patent No.: US 12,171,239 B2
(45) Date of Patent: Dec. 24, 2024

(54) QUANTITATIVE DIVISION UNIT, QUANTITATIVE DIVISION METHOD, AND FOOD PRODUCTION METHOD

(71) Applicant: NICHIREI FOODS INC., Tokyo-to (JP)

(72) Inventors: Minoru Mamiya, Chiba (JP); Ryuichi Itou, Chiba (JP); Suguru Hirayama, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 966 days.

(21) Appl. No.: 17/260,665

(22) PCT Filed: Jul. 12, 2019

(86) PCT No.: PCT/JP2019/027643
§ 371 (c)(1),
(2) Date: Jan. 15, 2021

(87) PCT Pub. No.: WO2020/017443
PCT Pub. Date: Jan. 23, 2020

(65) Prior Publication Data
US 2021/0259258 A1    Aug. 26, 2021

(30) Foreign Application Priority Data

Jul. 18, 2018    (JP) ................. 2018-135228

(51) Int. Cl.
*A21C 5/02*    (2006.01)
*A21C 11/10*    (2006.01)
*A23P 30/20*    (2016.01)

(52) U.S. Cl.
CPC ............... *A21C 5/02* (2013.01); *A21C 11/10* (2013.01); *A23P 30/20* (2016.08)

(58) Field of Classification Search
CPC ......... A21C 11/10; A21C 15/007; A21C 5/02; A21C 9/063; A23P 30/20
(Continued)

(56) References Cited

U.S. PATENT DOCUMENTS 4,439,124 A    3/1984    Watanabe
2006/0245942 A1    11/2006    Hofmann et al.

FOREIGN PATENT DOCUMENTS

CN    1788160    *    6/2006
CN    1788160 A    6/2006
(Continued)

OTHER PUBLICATIONS

JP2004065044A translation, retrieved from Espacenet Nov. 29, 2023, originally published Mar. 4, 2004 (Year: 2004).*
(Continued)

*Primary Examiner* — Dana Ross
*Assistant Examiner* — Joseph W Iskra
(74) *Attorney, Agent, or Firm* — Birch, Stewart, Kolasch & Birch, LLP

(57) ABSTRACT

Provided are a quantitative division unit, a quantitative division method, and a food production method capable of accurately quantitatively dividing a paste ingredient while preventing the damage of the ingredient. A first plunger and a second plunger are shifted from a first driving state to a second driving state in such a manner that the paste ingredient is introduced between the first plunger and the second plunger via a first port due to a negative pressure generated in the area of an internal space between the first plunger and the second plunger. The first plunger and the second plunger are shifted from the second driving state to a third driving state where at least a part of the paste ingredient between the first plunger and the second plunger is disposed so as to face the second port. The first plunger and the second plunger are
(Continued)

then shifted from the third driving state to a fourth driving state so as to feed the paste ingredient to the outside via the second port.

10 Claims, 27 Drawing Sheets

(58) Field of Classification Search
USPC .......................................................... 99/489
See application file for complete search history.

(56) References Cited

FOREIGN PATENT DOCUMENTS

| JP | 57-22673 A | | 2/1982 |
|----|----|----|----|
| JP | 10000058 | * | 1/1998 |
| JP | 2000-4765 A | | 1/2000 |
| JP | 2004-65044 A | | 3/2004 |
| JP | 2004065044 | * | 3/2004 |
| JP | 2009-166054 A | | 7/2009 |
| JP | 2009166054 | * | 7/2009 |

OTHER PUBLICATIONS

JP2009166054A translation, retrieved from Espacenet Nov. 29, 2023, originally published Jul. 30, 2009 (Year: 2009).*
Chinese Office Action and Search Report for corresponding Chinese Application No. 201960046990.3, dated Oct. 29, 2021, with English translation.
International Preliminary Report on Patentability and English translation of the Written Opinion of the International Searching Authority, dated Jan. 28, 2021, for International Application No. PCT/JP2019/027643.
International Search Report for PCT/JP2019/027643 mailed on Sep. 24, 2019.
Written Opinion of the International Searching Authority for PCT/JP2019/027643 (PCT/ISA/237) mailed on Sep. 24, 2019.

* cited by examiner

QUANTITATIVE DIVISION UNIT, QUANTITATIVE DIVISION METHOD, AND FOOD PRODUCTION METHOD

TECHNICAL FIELD

The present invention relates to a quantitative division unit, a quantitative division method, and a food production method that divide and feed a quantitative paste ingredient.

BACKGROUND ART

In an automatic production system for foods containing paste ingredients (for example, spring rolls and gyoza dumplings), a large amount of a paste ingredient stored in a hopper or the like is divided into predetermined amounts, and the divided paste ingredient is fed to a subsequent device.

For example, Patent Literature 1 discloses a food molding machine that feeds a predetermined amount of an ingredient using a gear pump and a piston. Further, Patent Literature 2 discloses a quantitative division device capable of pumping an ingredient from a receiving port toward a cylinder and aligning the longitudinal direction of an elongated material with a pumping direction.

CITATION LIST

Patent Literature

Patent Literature 1: Japanese patent application publication No. 57-22673
Patent Literature 2: Japanese patent application publication No. 2000-4765

SUMMARY OF INVENTION

Technical Problem

There is still a need for improvement in the above conventional devices that quantitatively divide a paste ingredient and feed the divided paste ingredient to a subsequent stage, as follows.

In general, when the paste ingredient contains solid foods (for example, bamboo shoots, pork, and the like), in some cases, it is desirable to quantitatively divide the paste ingredient while the shape of the solid food is maintained so that the food texture (for example, chewiness, feeling on tongue, feeling to throat, or the like) provided by the solid food is not lost. However, in a device that feeds an ingredient using a gear pump like the food molding machine of Patent Literature 1, the solid ingredient is finely cut or crushed because of the structural characteristics of the gear pump, and thus the food texture may be significantly impaired. Further, even when the paste ingredient does not contain the solid ingredient, the paste ingredient may be kneaded more than necessary by the gear pump, and the flavor or the like other than the food texture may be impaired more than expected.

Meanwhile, since the quantitative division device of Patent Literature 2 does not use a gear pump, there is no concern about damage of ingredients that may be caused by the gear pump. However, the quantitative division device of Patent Literature 2 is required to have a pressure pump for pumping an ingredient toward a cylinder. For this reason, the number of parts increases, the device structure becomes complicated, and for example, it takes a considerable amount of time to assemble the device and prepare for the operation at the start of production, and it also takes a considerable amount of time to disassemble and clean the device at the end of production. In particular, in a production system in which after the paste ingredient is quantitatively divided, a further process of wrapping the paste ingredient in a skin is subsequently performed, such as a production system for spring rolls and gyoza, the quantitative division process becomes a bottleneck, and the improvement in the overall productivity of the system is hindered.

The present invention has been made in view of the above circumstances, and an object of the present invention is to provide a quantitative division unit, a quantitative division method, and a food production method that are capable of accurately quantitatively dividing a paste ingredient while preventing the damage of the ingredient. Another object of the present invention is to provide a quantitative division unit, a quantitative division method, and a food production method that are capable of improving the productivity of food by using a quantitative division device with a simple configuration.

Solution to Problem

One aspect of the present invention is directed to a quantitative division unit comprising a quantitative division device that feeds a predetermined amount of a paste ingredient, wherein the quantitative division device comprises: a peripheral wall portion that has a hollow shape and includes an internal space extending in a first direction, a first port via which outside communicates with the internal space, and a second port via which outside communicates with the internal space and which is provided at a position different from the first port in terms of the first direction, a first plunger and a second plunger that are arranged to face each other in the first direction in the internal space and that are provided to be movable in the first direction, and a drive unit that moves the first plunger and the second plunger in the first direction, the drive unit moves at least one of the first plunger and the second plunger to shift the first plunger and the second plunger from a first driving state where the first plunger and the second plunger are arranged in such a manner that a space or a contact surface between the first plunger and the second plunger is located at a position facing the first port, to a second driving state where the first plunger and the second plunger are separated from each other, so as to introduce the paste ingredient between the first plunger and the second plunger via the first port due to a negative pressure generated in an area of the internal space between the first plunger and the second plunger, moves the first plunger and the second plunger to shift the first plunger and the second plunger from the second driving state to a third driving state where at least a part of the paste ingredient between the first plunger and the second plunger is disposed to face the second port while the first plunger is kept separated from the second plunger, and moves at least one of the first plunger and the second plunger to bring the first plunger and the second plunger close to each other to shift the first plunger and the second plunger from the third driving state to a fourth driving state where the first plunger and the second plunger are arranged in such a manner that the space or the contact surface between the first plunger and the second plunger is located at a position facing the second port, so as to feed the paste ingredient between the first plunger and the second plunger to outside via the second port.

The quantitative division unit may further comprise a storage portion that is connected to the first port and stores the paste ingredient, wherein when the first plunger and the second plunger shift from the first driving state to the second driving state, the paste ingredient stored in the storage portion may be affected by the negative pressure without being pressurized toward the first port to be introduced between the first plunger and the second plunger via the first port.

When the first plunger and the second plunger shift from the second driving state to the third driving state, an end portion of the first plunger on a side of the second plunger may pass at least a portion of the internal space facing the first port to cut the paste ingredient, and in the third driving state, the first port may be entirely covered by the first plunger.

The first plunger may have a cutter portion that projects toward the second plunger in at least a part of an outer peripheral portion of an end portion of the first plunger on a side of the second plunger, the second plunger may have a receiving portion that has a recessed shape matching a shape of the cutter portion at an end portion of the second plunger on a side of the first plunger, and the cutter portion may engage with the receiving portion in each of the first driving state and the fourth driving state.

The paste ingredient may contain an amorphous viscous ingredient having fluidity and a linear ingredient mixed with the viscous ingredient, and when the drive unit shifts the first plunger and the second plunger from the first driving state to the second driving state, the drive unit may set a movement amount of one of the first plunger and the second plunger to be larger than a movement amount of the other.

When the drive unit shifts the first plunger and the second plunger from the first driving state to the second driving state, the drive unit may not substantially move one of the first plunger and the second plunger while moving only the other.

The drive unit may include: a first plunger drive unit that moves the first plunger in the first direction; and a second plunger drive unit that moves the second plunger in the first direction.

The first plunger drive unit may be coupled to the first plunger, the second plunger drive unit may be coupled to the second plunger, the drive unit may further include: first coupling drive unit that is coupled to the first plunger drive unit and moves the first plunger and the first plunger drive unit in the first direction in an integrated manner, and a second coupling drive unit that is coupled to the second plunger drive unit and moves the second plunger and the second plunger drive unit in the first direction in an integrated manner, both the first coupling drive unit and the second coupling drive unit may be configured by a single common coupling drive unit, and the common coupling drive unit may move the first plunger, the first plunger drive unit, the second plunger, and the second plunger drive unit in the first direction in an integrated manner.

A plurality of quantitative division devices may be provided, and the second port of a first quantitative division device among the plurality of quantitative division devices may be connected to the first port of a second quantitative division device among the plurality of quantitative division devices.

Another aspect of the present invention is directed to a quantitative division method that feeds a predetermined amount of a paste ingredient by using a quantitative division device that includes a peripheral wall portion having a hollow shape, and a first plunger and a second plunger that are provided so as to be movable in a first direction in an internal space of the peripheral wall portion, the quantitative division method comprising the steps of: bringing the first plunger and the second plunger into a first driving state where the first plunger and the second plunger are arranged in such a manner that a space or a contact surface between the first plunger and the second plunger is located at a position facing a first port formed in the peripheral wall portion; shifting the first plunger and the second plunger from the first driving state to a second driving state where the first plunger and the second plunger are separated from each other so as to introduce the paste ingredient between the first plunger and the second plunger via the first port due to a negative pressure generated in an area of the internal space between the first plunger and the second plunger; shifting the first plunger and the second plunger from the second driving state to a third driving state where at least a part of the paste ingredient between the first plunger and the second plunger is disposed to face a second port formed in the peripheral wall portion while the first plunger is kept separated from the second plunger; and bringing the first plunger and the second plunger close to each other to shift the first plunger and the second plunger from the third driving state to a fourth driving state where the first plunger and the second plunger are arranged in such a manner that the space or the contact surface between the first plunger and the second plunger is located at a position facing the second port, so as to feed the paste ingredient between the first plunger and the second plunger to outside via the second port.

Yet another aspect of the present invention is directed to a food production method that uses a paste ingredient divided by the quantitative division method as described above.

Advantageous Effects of Invention

According to the present invention, the paste ingredient can be accurately quantitatively divided while the damage of the ingredient is prevented. Moreover, the productivity of food can be improved.

DESCRIPTION OF EMBODIMENTS

Figure 1:
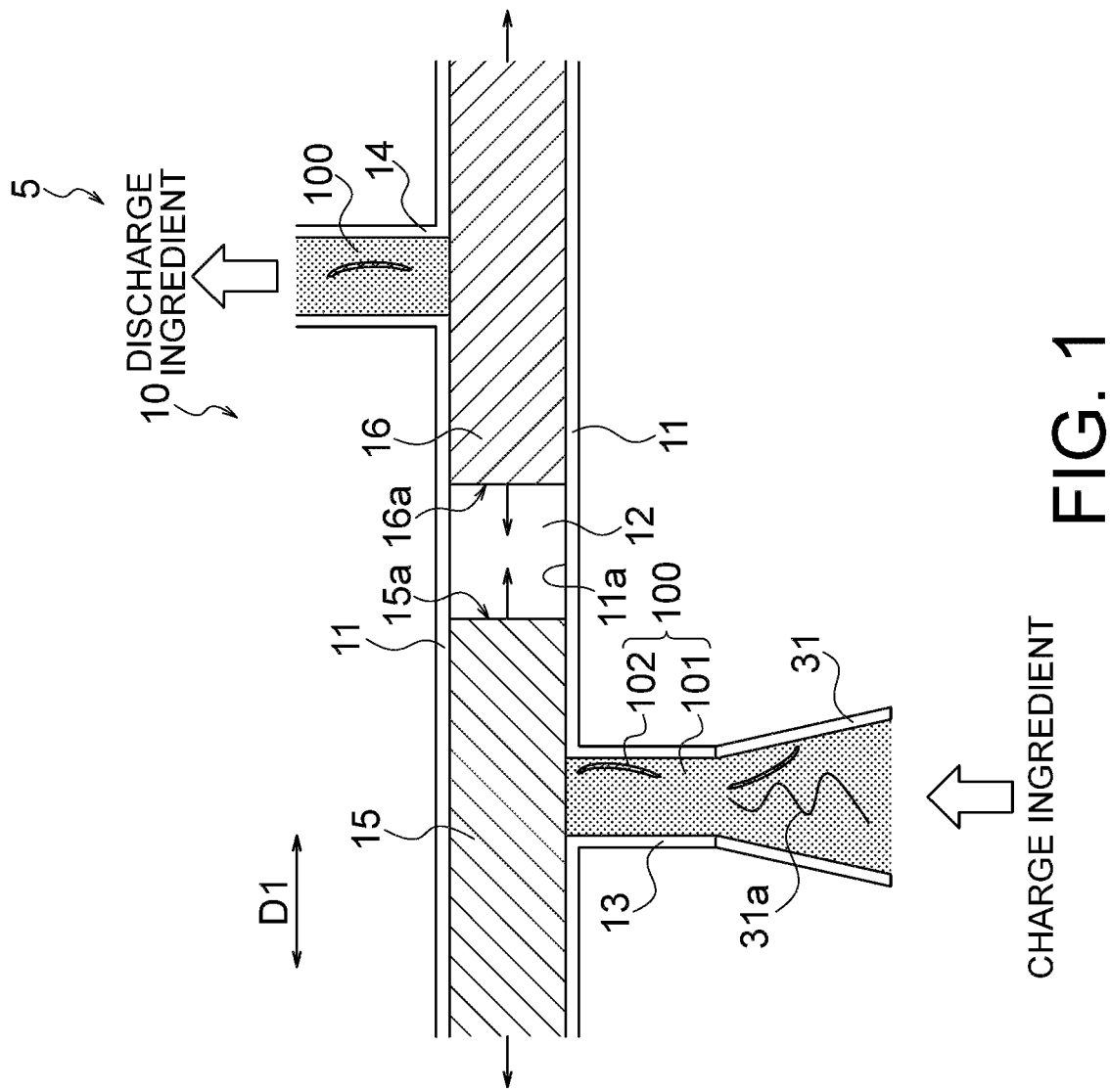
FIG. 1 is a cross-sectional view illustrating a basic configuration of a quantitative division device included in a quantitative division unit.

Hereinafter, typical embodiments of the present invention will be illustrated with reference to the drawings. The size and scale of the elements illustrated in the drawings do not necessarily match the real ones, and do not match between the drawings, for convenience of illustration and understanding. However, those skilled in the art who have ordinary knowledge can clearly understand the configuration, and operation and effect of the elements illustrated in the respective drawings in consideration of the description of the present specification and the claims.

[Overall Configuration of Quantitative Division Device 10]

FIG. 1 is a cross-sectional view illustrating a basic configuration of a quantitative division device 10 included in a quantitative division unit 5. The quantitative division device 10 that feeds a predetermined amount of a paste ingredient 100 includes a peripheral wall portion 11, a first plunger 15, and a second plunger 16.

The peripheral wall portion 11 has a hollow shape, and includes an internal space 12 extending in a first direction D1, a first port 13 that causes the outside to communicate with the internal space 12, and a second port 14 that causes the outside to communicate with the internal space 12 and is provided at a different position from the first port 13 in the first direction D1. The first port 13 functions as an entrance port for introducing the paste ingredient 100 into the internal space 12 of the peripheral wall portion 11, whereas the second port 14 functions as an exit port for discharging the paste ingredient 100, which has been quantitatively divided, from the internal space 12 in the peripheral wall portion 11. The orientation of the first port 13 and the second port 14 is not limited, and the first port 13 and the second port 14 may extend in the same direction or may extend in different directions from each other. For example, the first port 13 and the second port 14 may extend in a horizontal direction or may respectively extend in a direction parallel to an upright direction (that is, vertical direction). Further, the orientation of openings of the first port 13 and the second port 14 with respect to the internal space 12 is not limited. By arranging the first port 13 above the internal space 12, it is possible to introduce the paste ingredient 100 from the first port 13 into the internal space 12 by using gravity. Alternatively, by arranging the second port 14 below the internal space 12, it is possible to discharge the paste ingredient 100 from the internal space 12 to the second port 14 by using gravity.

The term "space" in the present specification and the claims refers to a three-dimensional area in general, and an object may or may not be present in the area. For example, the internal space 12 is an area formed inside the peripheral wall portion 11, and the area is referred to as "internal space 12" regardless of whether or not the first plunger 15, the second plunger 16, and the paste ingredient 100 are disposed in the area.

A storage portion 31 composed of a hopper or the like is connected to the first port 13, and a large amount of the paste ingredient 100 stored in the storage portion 31 is introduced into the internal space 12 via the first port 13. The illustrated storage portion 31 includes a feed device 31a (for example, spiral screw device), and the feed device 31a mixes the paste ingredient 100 in the storage portion 31 and feeds the paste ingredient 100 toward the first port 13. A discharge pipe (see reference numeral "39" in FIG. 16) is connected to the second port 14, and the paste ingredient 100 discharged from the internal space 12 via the second port 14 is fed to a subsequent stage via this discharge pipe.

The paste ingredient 100 contains an amorphous viscous ingredient having fluidity, and its specific constituent components are not limited, and may be composed of a single type of ingredient or may contain a plurality of types of ingredients. For example, the paste ingredient 100 may contain not only, for example, meat, seafood, vegetables, mushrooms, grains, fruits, seaweeds, beans, chocolates, cookies, crackers, puffs, candies, gummies, and other solid ingredients, but also eggs, milk, water, oils, seasonings, spices, sugars, grain flours, starches, gelling agents, thickeners, and other liquid and powdered ingredients. The paste ingredient 100 of the present embodiment contains a viscous ingredient 101 made by mixing a plurality of ingredients and a linear ingredient 102 mixed with the viscous ingredient 101. The linear ingredient 102 has an elongated shape, and may be a soft ingredient that can be bent without being damaged, or may be a hard ingredient that cannot be bent basically without being damaged. Typically, an ingredient having unique rigidity and elasticity that give a unique texture to the food (for example, bamboo shoots, meat, or the like) can be used as the linear ingredient 102.

The first plunger 15 and the second plunger 16 are arranged in the internal space 12 of the peripheral wall portion 11 so as to face each other in the first direction D1, and are provided to be movable in the first direction D1 (that is, left-right direction in FIG. 1) while being in close contact with an inner wall surface 11a of the peripheral wall portion 11. As described above, the first plunger 15 and the second plunger 16 have a piston structure provided so as to be reciprocally movable in the internal space 12. The first plunger 15 and the second plunger 16 illustrated in FIG. 1 can move in the first direction D1 while maintaining a state of being in contact with the inner wall surface 11a without a gap. Consequently, the paste ingredient 100 introduced between the first plunger 15 and the second plunger 16 basically does not leak from between the inner wall surface 11a of the peripheral wall portion 11 and the first plunger 15 or between the inner wall surface 11a of the peripheral wall portion 11 and the second plunger 16.

A seal member (see reference numeral "36" in FIGS. 10A to 10D to be described later) may be provided on the inner wall surface 11a of the peripheral wall portion 11. As such a seal member is provided, it is possible to prevent more effectively the paste ingredient 100 from leaking from between the inner wall surface 11a of the peripheral wall portion 11 and the first plunger 15 or between the inner wall surface 11a of the peripheral wall portion 11 and the second plunger 16. Further, when such a seal member is used, the first plunger 15 and the second plunger 16 do not necessarily have to be in close contact with the inner wall surface 11a of the peripheral wall portion 11, and some gaps may be present between each of the first plunger 15 and the second plunger 16 and the inner wall surface 11a.

The first plunger 15 and the second plunger 16 are moved in the first direction D1 by a drive unit. The specific configuration of this drive unit is not limited, and it is possible to achieve such a drive unit in various forms.

[Drive Unit]

Figure 2:
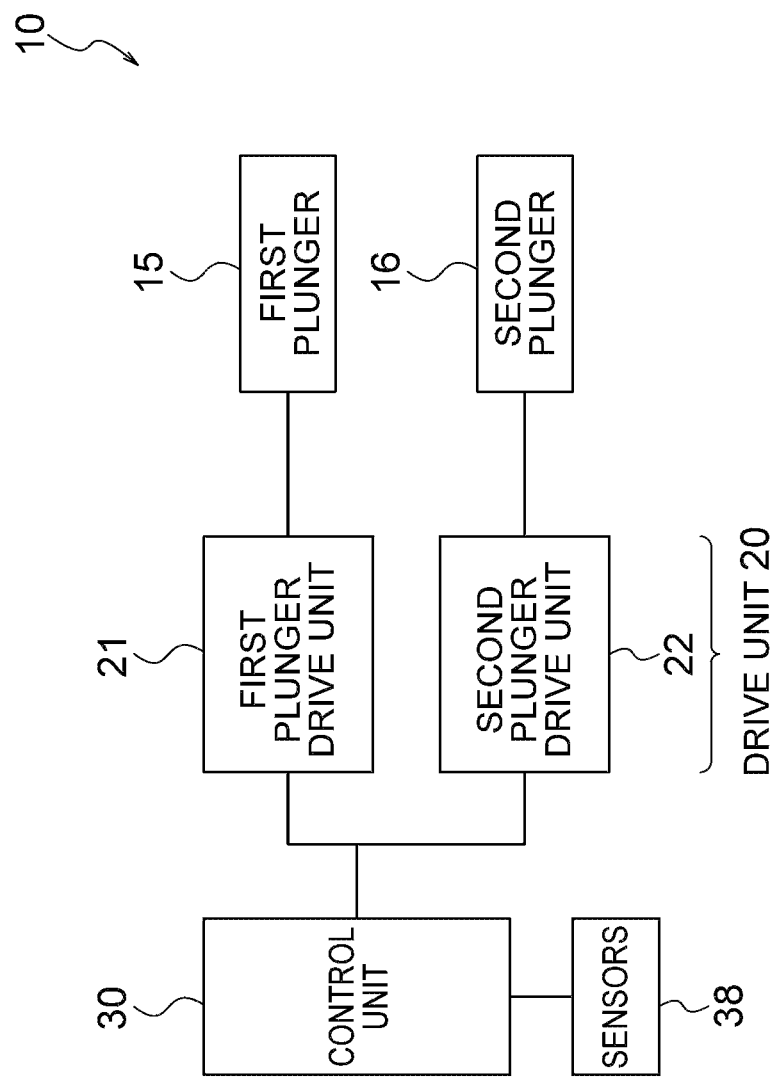
FIG. 2 is a block diagram illustrating an example of a configuration of a drive unit.

FIG. 2 is a block diagram illustrating an example of a configuration of a drive unit 20.

The drive unit 20 illustrated in FIG. 2 includes a first plunger drive unit 21 and a second plunger drive unit 22, and each of the first plunger drive unit 21 and the second plunger drive unit 22 is connected to a control unit 30. The first plunger drive unit 21 is connected to the first plunger 15, and the second plunger drive unit 22 is connected to the second plunger 16. The first plunger drive unit 21 and the second plunger drive unit 22 can move the first plunger 15 and the second plunger 16 in the first direction D1 under the control of the control unit 30, respectively, to arrange the first plunger 15 and the second plunger 16 at desired positions in the internal space 12 of the peripheral wall portion 11.

In the quantitative division device 10 with the functional configuration illustrated in FIG. 2, the control unit 30 controls the first plunger drive unit 21 when moving the first plunger 15, controls the second plunger drive unit 22 when moving the second plunger 16, and controls the first plunger drive unit 21 and the second plunger drive unit 22 at the same time when moving the first plunger 15 and the second plunger 16 at the same time.

Figure 3:
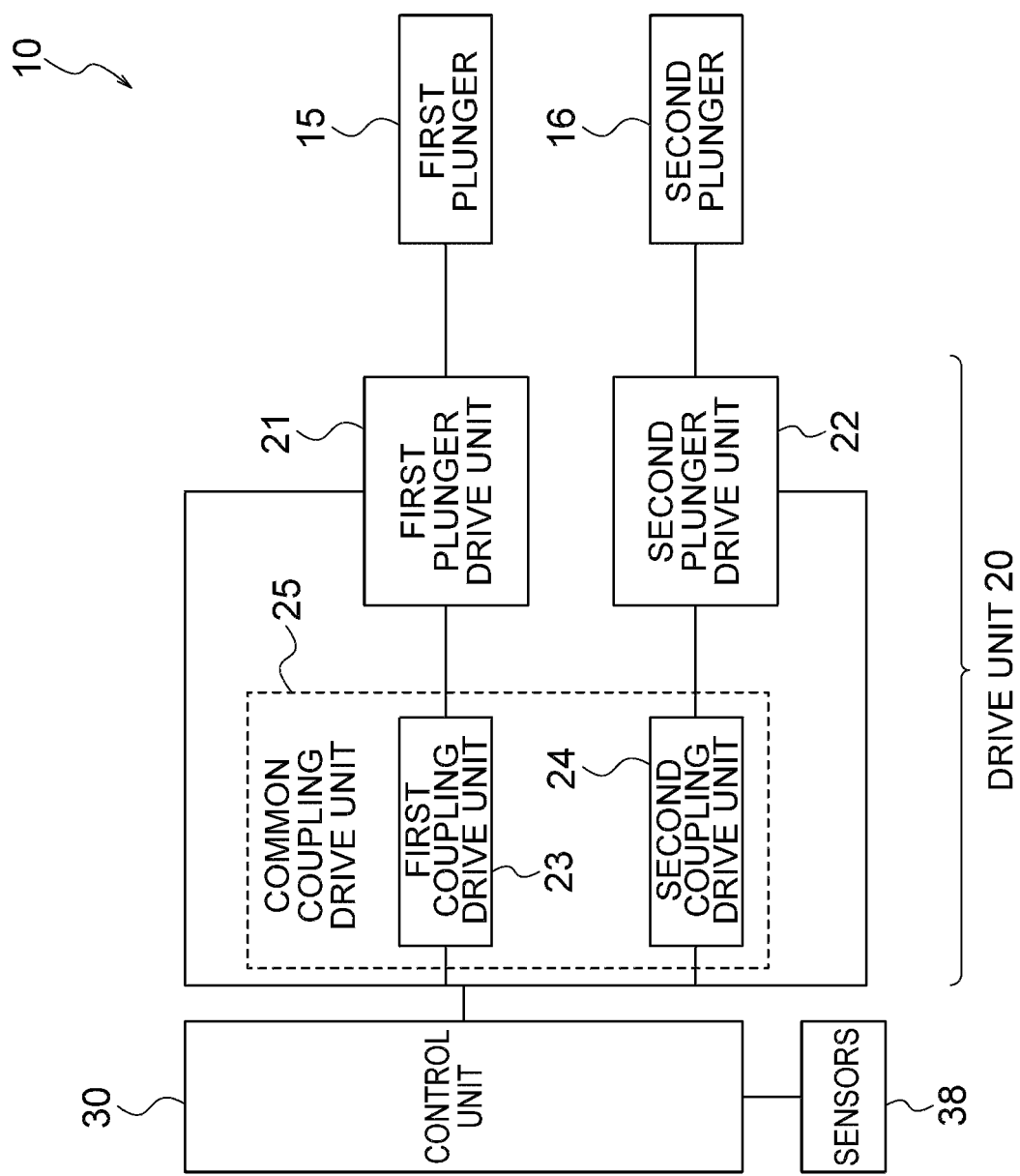
FIG. 3 is a block diagram illustrating another example of the configuration of the drive unit.

FIG. 3 is a block diagram illustrating another example of the configuration of the drive unit 20.

As illustrated in FIG. 3, the first plunger drive unit 21 and the second plunger drive unit 22 may be connected to the first plunger 15 and the second plunger 16, respectively, and may also be connected to a first coupling drive unit 23 and a second coupling drive unit 24, respectively. That is, the drive unit 20 may include the first plunger drive unit 21 coupled to the first plunger 15, the first coupling drive unit 23 coupled to the first plunger drive unit 21, the second plunger drive unit 22 coupled to the second plunger 16, and the second coupling drive unit 24 coupled to the second plunger drive unit 22. In this case, the first coupling drive unit 23 can integrally move the first plunger 15 and the first plunger drive unit 21 in the first direction D1 under the control of the control unit 30. Similarly, the second coupling drive unit 24 can integrally move the second plunger 16 and the second plunger drive unit 22 in the first direction D1 under the control of the control unit 30.

Both the first coupling drive unit 23 and the second coupling drive unit 24 may be configured with a single common coupling drive unit 25 (see FIG. 14 to be described later). In this case, the common coupling drive unit 25 can integrally move the first plunger 15, the first plunger drive unit 21, the second plunger 16, and the second plunger drive unit 22 in the first direction D1 under the control of the control unit 30.

As described above, the drive unit 20 can be provided in various forms, and specific devices constituting the drive unit 20 are not limited. Typically, a servomotor or an air cylinder can be used in the drive unit 20, and each of the first plunger drive unit 21, the second plunger drive unit 22, the first coupling drive unit 23, the second coupling drive unit 24, and the common coupling drive unit 25 can be configured with the servomotor or the air cylinder. It is also possible to configure each of the first plunger drive unit 21 and the second plunger drive unit 22 with a plurality of air cylinders connected in series with each other.

The quantitative division device 10 further includes sensors 38 that detect the positions of the first plunger 15 and the second plunger 16. The detection result of the sensors 38 that directly or indirectly indicate the position of the first plunger 15 and the position of the second plunger 16 is transmitted to the control unit 30, and the control unit 30 controls the drive unit 20 on the basis of the detection result of the sensors 38. For example, an optical sensor (not illustrated) including a light emitting element and a light receiving element can be used as the sensors 38 to directly detect the position of the first plunger 15 and the position of the second plunger 16. When the first plunger 15 and the second plunger 16 are configured with a servomotor, it is also possible to indirectly detect the position of the first plunger 15 and the position of the second plunger 16 on the basis of the driving state of the servomotor and/or a servomotor control signal from the control unit 30.

[Quantitative Division Method]

Next, an example of a quantitative division method in which a predetermined amount of the paste ingredient 100 is fed by using the quantitative division device 10 described above will be described.

Figure 4:
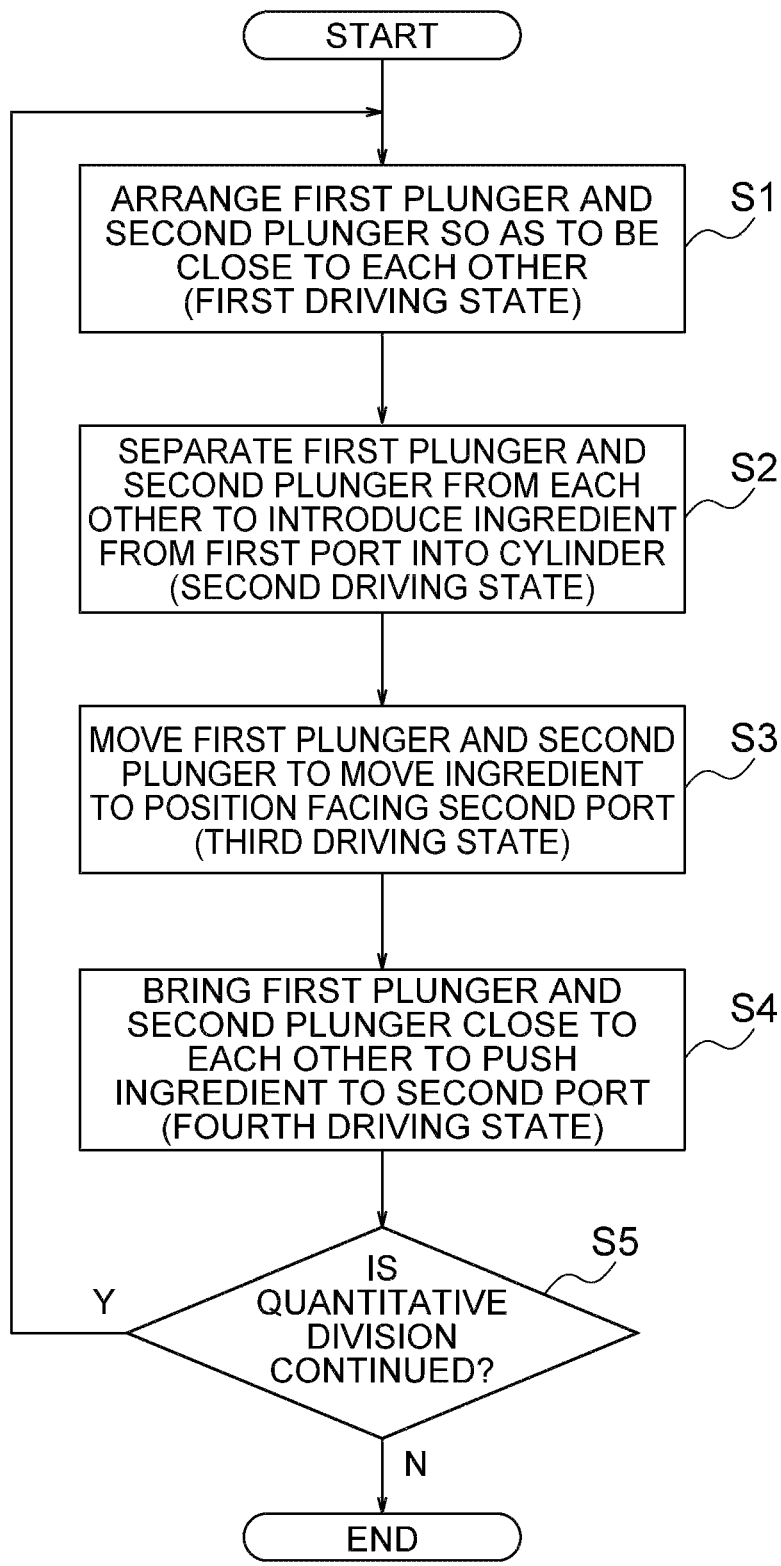
FIG. 4 is a flowchart illustrating an example of a quantitative division method.
Figure 5:
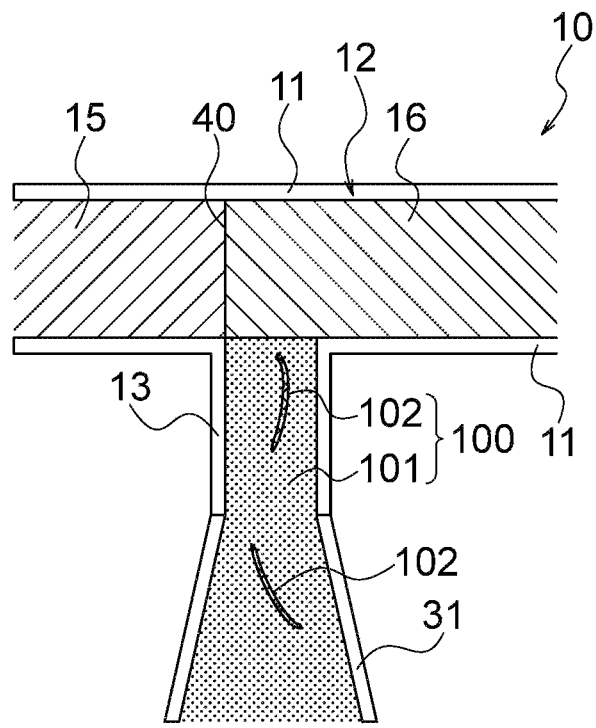
FIG. 5 is an enlarged cross-sectional view of the quantitative division device for explaining a first driving state.
Figure 6:
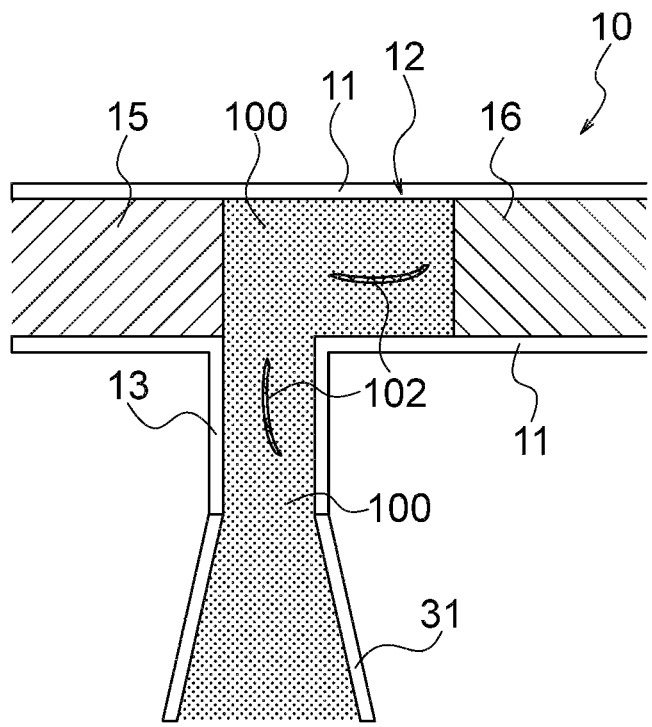
FIG. 6 is an enlarged cross-sectional view of the quantitative division device for explaining a second driving state.
Figure 7:
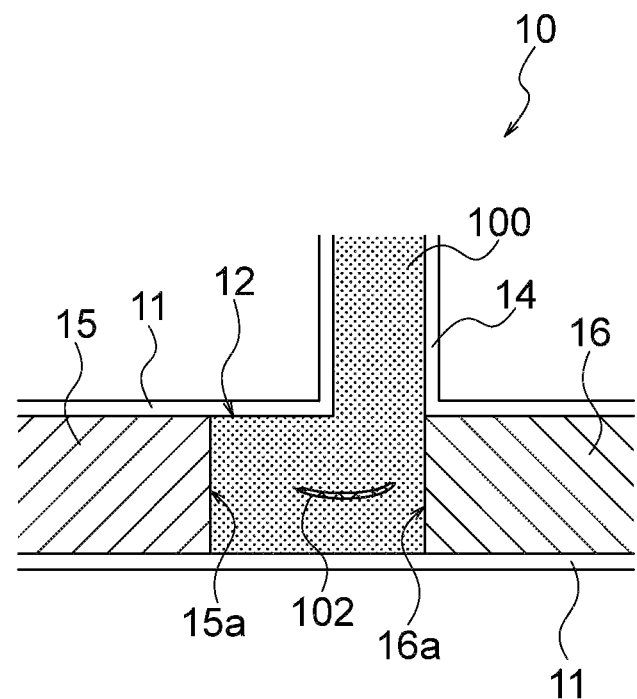
FIG. 7 is an enlarged cross-sectional view of the quantitative division device for explaining a third driving state.
Figure 8:
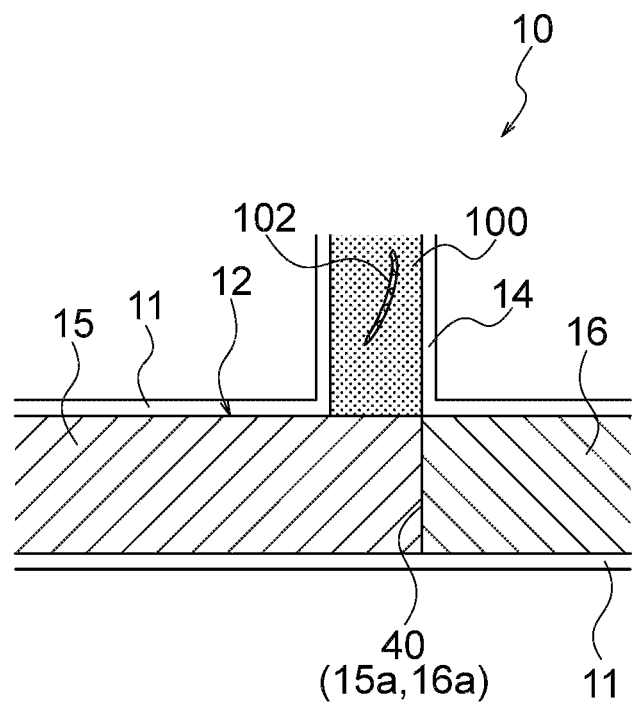
FIG. 8 is an enlarged cross-sectional view of the quantitative division device for explaining a fourth driving state.

FIG. 4 is a flowchart illustrating an example of the quantitative division method. FIG. 5 is an enlarged cross-sectional view of the quantitative division device 10 for explaining a first driving state. FIG. 6 is an enlarged cross-sectional view of the quantitative division device 10 for explaining a second driving state. FIG. 7 is an enlarged cross-sectional view of the quantitative division device 10 for explaining a third driving state. FIG. 8 is an enlarged cross-sectional view of the quantitative division device 10 for explaining a fourth driving state.

The drive unit 20 sequentially brings the first plunger 15 and the second plunger 16 into the first driving state, the second driving state, the third driving state, and the fourth driving state in order under the control of the control unit 30, thus quantitatively dividing the paste ingredient 100 and discharging the paste ingredient 100 to a subsequent stage.

The drive unit 20 first arranges the first plunger 15 and the second plunger 16 so as to be close to each other in the internal space 12 of the peripheral wall portion 11 so that the space or a contact surface 40 between the first plunger 15 and the second plunger 16 is located at a position facing the first port 13 (first driving state; see "S1" in FIG. 4). In the example illustrated in FIG. 5, the first plunger 15 and the second plunger 16 in the first driving state are in contact with each other to form the contact surface 40, but the first plunger 15 and the second plunger 16 in the first driving state do not have to be in contact with each other, and a space may be formed between the first plunger 15 and the second plunger 16. In this case, the distance in the first direction D1 between the first plunger 15 and the second plunger 16 in the first driving state can be, for example, about several mm to several cm.

In the example illustrated in FIG. 5, the contact surface 40 is disposed at a position corresponding to an opening edge of the first port 13 (left opening edge in FIG. 5), and the first port 13 is closed and covered only by the second plunger 16. However, the positions of the first plunger 15 and the second plunger 16 in the first driving state are not limited. While the first plunger 15 and the second plunger 16 are in the first driving state, the first port 13 may be covered by both the first plunger 15 and the second plunger 16, or may be covered only by the first plunger 15. In this way, the first port 13 is partially or entirely covered by the first plunger 15 and the second plunger 16 in the first driving state.

The first plunger 15 and the second plunger 16 in the first driving state may be stopped or may be moved in the first direction D1. For example, in the process of moving the first plunger 15 and/or the second plunger 16 from the state where the space or the contact surface 40 between the first plunger 15 and the second plunger 16 does not face the first port 13, the first plunger 15 and the second plunger 16 may be in the first driving state as described above.

The drive unit 20 then moves at least one of the first plunger 15 and the second plunger 16 to shift the first plunger 15 and the second plunger 16 from the first driving state to the second driving state where the first plunger 15 and the second plunger 16 are separated from each other ("S2" in FIG. 4; see FIG. 6). As a result, a vacuum space is formed in the area of the internal space 12 between the first plunger 15 and the second plunger 16 for a short time, and due to the negative pressure generated in that area, the paste ingredient 100 is introduced between the first plunger 15 and the second plunger 16 via the first port 13. The vacuum as referred here is broadly interpreted, and means a spatial state where the pressure is lower than the outside of the peripheral wall portion 11, and in particular, means a spatial state where the pressure is lower than the atmospheric pressure when the quantitative division device 10 is placed under the atmospheric pressure.

In the present embodiment, when the first plunger 15 and the second plunger 16 shift from the first driving state to the second driving state, the paste ingredient 100 stored in the storage portion 31 is not pressurized toward the first port 13. That is, the paste ingredient 100 stored in the storage portion 31 is affected by the negative pressure in the area between the first plunger 15 and the second plunger 16 to be introduced between the first plunger 15 and the second plunger 16 via the first port 13. Consequently, according to the quantitative division device 10 and the quantitative division method of the present embodiment, it is not required to have a pressure pump that is required in the quantitative division device of Patent Literature 2.

In shifting the first plunger 15 and the second plunger 16 from the first driving state to the second driving state under the control of the control unit 30, the drive unit 20 may set the movement amount of one of the first plunger 15 and the second plunger 16 to be larger than the movement amount of the other one. In this case, a larger amount of the paste ingredient 100 is sucked toward the plunger with a larger movement amount among the first plunger 15 and the second plunger 16. As a result, the postures (that is, orientation directions) of the linear ingredients 102 contained in the paste ingredient 100 can be aligned in the internal space 12 of the peripheral wall portion 11. That is, since the paste ingredient 100 is more strongly sucked toward the plunger with a larger movement amount as an overall tendency, the longitudinal direction of the linear ingredient 102 in the internal space of the peripheral wall portion 11 is easily aligned with the first direction D1. As the postures (orientation direction) of the linear ingredients 102 are aligned in this way, it can be expected that the food texture brought by the linear ingredient 102 improves.

In the example illustrated in FIG. 6, only the second plunger 16 is moved from the first driving state illustrated in FIG. 5, and the first plunger 15 is not moved from the first driving state. In shifting the first plunger 15 and the second plunger 16 from the first driving state to the second driving state, the drive unit 20 may move only one of the first plunger 15 and the second plunger 16 (second plunger 16 in FIGS. 5 and 6) without substantially moving the other (first plunger 15 in FIGS. 5 and 6). In this case, the paste ingredient 100 can be strongly sucked toward the one plunger (toward second plunger 16 in FIGS. 5 and 6), and the posture (orientation direction) of the linear ingredient 102 can be accurately aligned with the first direction D1.

The drive unit 20 then moves the first plunger 15 and the second plunger 16 to shift the first plunger 15 and the second plunger 16 from the second driving state to the third driving state where at least a part of the paste ingredient 100 between the first plunger 15 and the second plunger 16 is disposed so as to face the second port 14 while the first plunger 15 is kept separated from the second plunger 16 ("S3" in FIG. 4; see FIG. 7).

In the example illustrated in FIG. 7, an end portion 16a of the second plunger 16 on the side of the first plunger 15 is disposed at a position corresponding to an opening edge of the second port 14 (that is, right opening edge in FIG. 7), and the first plunger 15 and the second plunger 16 are in the third driving state with the second port 14 not covered by either the first plunger 15 or the second plunger 16. However, the second port 14 may be partially covered by the first plunger 15 and/or the second plunger 16 in a state where the first plunger 15 and the second plunger 16 are in the third driving state. Alternatively, an end portion 15a of the first plunger 15 on the side of the second plunger 16 may be disposed at a position corresponding to an opening edge of the second port 14 (that is, left opening edge in FIG. 7). The distance in the first direction D1 between the first plunger 15 and the second plunger 16 in the third driving state illustrated in FIG. 7 is basically equal to the distance in the first direction D1 between the first plunger 15 and the second plunger 16 in the second driving state illustrated in FIG. 6.

The drive unit 20 then moves at least one of the first plunger 15 and the second plunger 16 to bring the first plunger 15 and the second plunger 16 close to each other. That is, the drive unit 20 shifts the first plunger 15 and the second plunger 16 from the third driving state described above to the fourth driving state where the first plunger 15 and the second plunger 16 are arranged so that the space or the contact surface 40 between the first plunger 15 and the second plunger 16 is located at a position facing the second port 14 ("S4" in FIG. 4; see FIG. 8). As a result, the paste ingredient 100 between the first plunger 15 and the second plunger 16 can be fed to the outside via the second port 14.

In the example illustrated in FIG. 8, while the second plunger 16 keeps stopping from the third driving state illustrated in FIG. 7, the first plunger 15 is moved in a direction of approaching the second plunger 16 (right direction in FIG. 8), the paste ingredient 100 in the internal space 12 of the peripheral wall portion 11 is pushed into the second port 14 by the first plunger 15, and the first plunger 15 finally contacts the second plunger 16. As a result, the contact surface 40 between the first plunger 15 and the second plunger 16 is disposed at the position corresponding to the opening edge of the second port 14 (that is, right opening edge in FIG. 7), and all the paste ingredient 100 between the first plunger 15 and the second plunger 16 is pushed into the second port 14. The first plunger 15 and the second plunger 16 in the fourth driving state do not have to contact each other, and a space may be formed between these first plunger 15 and second plunger 16. In this case, the distance in the first direction D1 between the first plunger 15 and the second plunger 16 in the fourth driving state can be, for example, about several mm to several cm.

The present inventors actually manufactured the quantitative division device 10 illustrated in FIG. 1 and performed the steps described above (that is, steps S1 to S4) on the basis of FIGS. 5 to 8. In that practice, all the linear ingredients 102 contained in the paste ingredient 100 were moved to the second port 14 without being crushed by the first plunger 15 and the second plunger 16 in the fourth driving state and in contact with each other as illustrated in FIG. 8. The first plunger 15 and the second plunger 16 in the fourth driving state do not have to contact each other, and a space may be formed between these first plunger 15 and second plunger 16.

By operating the quantitative division device 10 on the basis of steps S1 to S4 described above, the paste ingredient 100 stored in the storage portion 31 can be quantitatively divided, and the divided paste ingredient 100 can be fed to a subsequent stage via the second port 14. When the quantitative division of the paste ingredient 100 described above is repeatedly performed ("Y" in "S5" in FIG. 4), the drive unit 20 returns the first plunger 15 and the second plunger 16 to the first driving state (see FIG. 5) described above under the control of the control unit 30, and steps S1 to S4 described above are performed again. On the other hand, when the quantitative division of the paste ingredient 100 is not repeated ("N" in "S5" in FIG. 4), the implementation of the quantitative division method ends.

[Configuration of Plunger]

In the present embodiment, when the first plunger 15 and the second plunger 16 shift from the second driving state (see FIG. 6) to the third driving state (see FIG. 7), the end portion 15a of the first plunger 15 on the side of the second plunger 16 passes at least a portion of the internal space 12 facing the first port 13. At that time, the end portion 15a of the first plunger 15 cuts the paste ingredient 100 at the boundary between the internal space 12 and the first port 13. In the third driving state (see FIG. 7), the first port 13 is entirely covered by the first plunger 15.

When the first plunger 15 and the second plunger 16 shift from the third driving state (see FIG. 7) to the fourth driving state (see FIG. 8), the end portion 15a of the first plunger 15 on the side of the second plunger 16 and/or the end portion 16a of the second plunger 16 on the side of the first plunger 15 passes at least a portion of the internal space 12 facing the second port 14.

As described above, at least the first plunger 15 of the first plunger 15 and the second plunger 16 has a function of cutting the paste ingredient 100. Consequently, at least the first plunger 15 (particularly, end portion 15a on side of second plunger 16) of the first plunger 15 and the second plunger 16 preferably has a shape suitable for cutting the paste ingredient 100.

FIGS. 9A to 9J are views illustrating a schematic shape of the cross sections of the first plunger 15 and the second plunger 16.

Figure 9A:
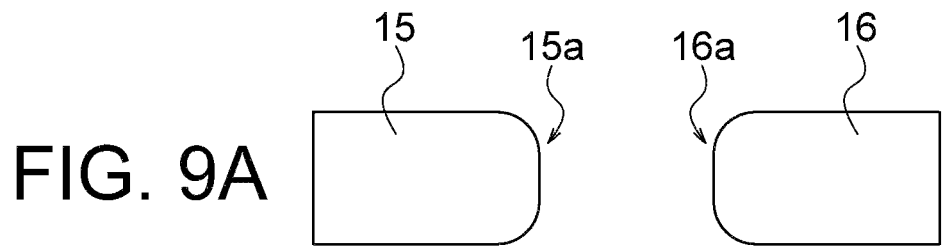
FIG. 9A is a view illustrating a schematic shape of cross sections of a first plunger and a second plunger.
Figure 9B:
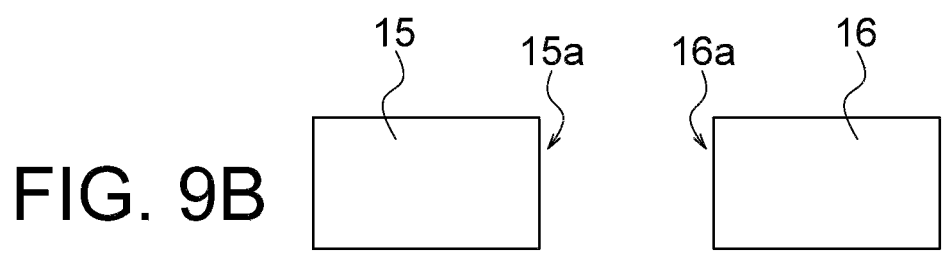
FIG. 9B is a view illustrating a schematic shape of the cross sections of the first plunger and the second plunger.

The outer peripheral portion of each of the end portion 15a of the first plunger 15 and the end portion 16a of the second plunger 16 may be rounded as illustrated in FIG. 9A. However, from the viewpoint of properly cutting the paste ingredient 100, for example, as illustrated in FIG. 9B, the outer peripheral portion of each of the end portion 15a of the first plunger 15 and the end portion 16a of the second plunger 16 is preferably not rounded but is angular and sharp.

In particular, the first plunger 15 preferably has a cutter portion 32 projecting toward the second plunger 16 at least in a part of the outer peripheral portion of the end portion 15a on the side of the second plunger 16. In this case, the second plunger 16 preferably has a receiving portion 33 that has a recessed shape matching the shape of the cutter portion 32 at the end portion 16a on the side of the first plunger 15. As a result, in each of the first driving state (see FIG. 5) and the fourth driving state (see FIG. 8), the cutter portion 32 engages with the receiving portion 33, and the first plunger 15 (that is, cutter portion 32) can be fitted into the second plunger 16 (that is, receiving portion 33). The state where the cutter portion 32 engages with the receiving portion 33 includes not only a state where the cutter portion 32 is in contact with the receiving portion 33, but also a state where the cutter portion 32 is not in contact with the receiving portion 33 and at least a part of a projecting portion formed by the cutter portion 32 is disposed in a recessed portion formed by the receiving portion 33. It can be assumed that the cutter portion 32 and the receiving portion 33 that have matching shapes as described above have various forms.

Figure 9C:
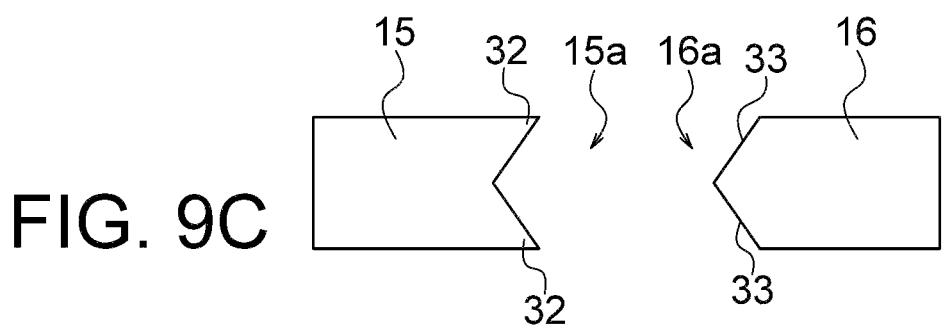
FIG. 9C is a view illustrating a schematic shape of the cross sections of the first plunger and the second plunger.
Figure 9D:
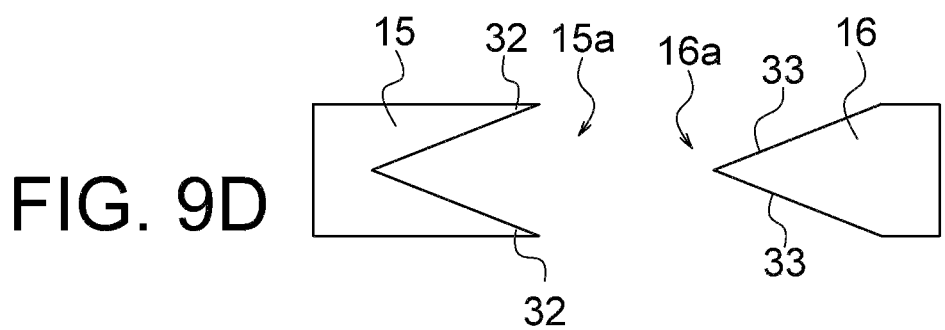
FIG. 9D is a view illustrating a schematic shape of the cross sections of the first plunger and the second plunger.
Figure 9E:
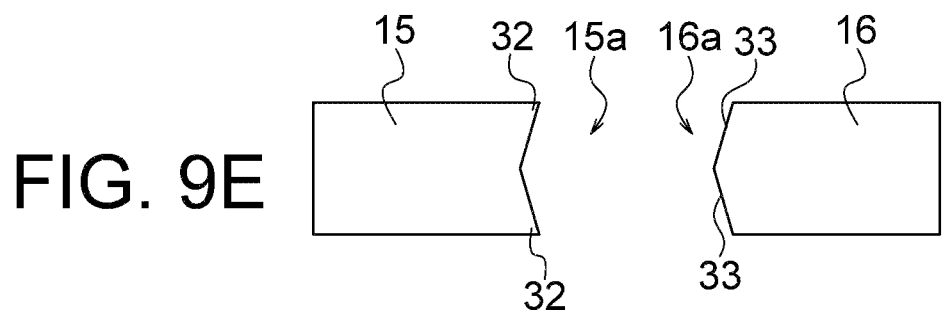
FIG. 9E is a view illustrating a schematic shape of the cross sections of the first plunger and the second plunger.

For example, as illustrated in FIGS. 9C to 9E, the end portion 15a of the first plunger 15 may have a conical cutaway portion, and the cutter portion 32 may be formed over the entire outer peripheral portion of the end portion 15a. The cutter portion 32 illustrated in FIGS. 9C to 9E is tapered toward the second plunger 16, and the distal end of the cutter portion 32 is sharp. The tilt angle of the cutter portion 32 is not limited, and the cutter portion 32 may have a relatively sharp tilt angle as illustrated in FIG. 9D, or may have a relatively gentle tilt angle as illustrated in FIG. 9E. Further, the tilt angle of the cutter portion 32 may change continuously or discontinuously. The end portion 16a of the second plunger 16 on the side of the first plunger 15 illustrated in FIGS. 9C to 9E has a conical shape, and the receiving portion 33 can be in close contact with the cutter portion 32 without any gap.

Figure 9F:
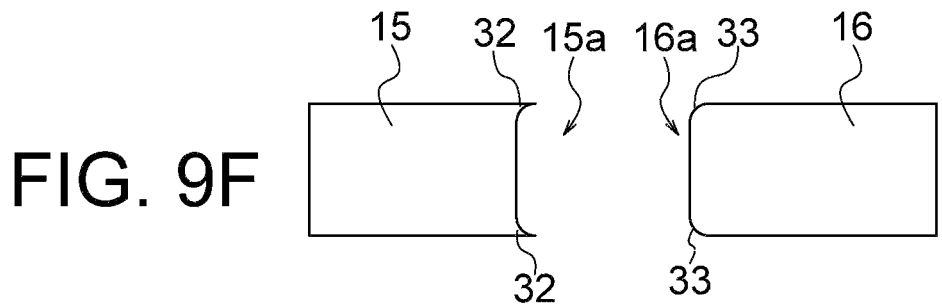
FIG. 9F is a view illustrating a schematic shape of the cross sections of the first plunger and the second plunger.
Figure 9G:
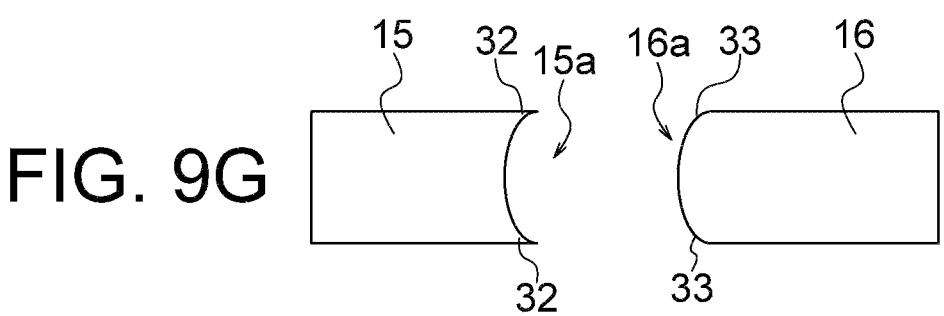
FIG. 9G is a view illustrating a schematic shape of the cross sections of the first plunger and the second plunger.
Figure 9H:
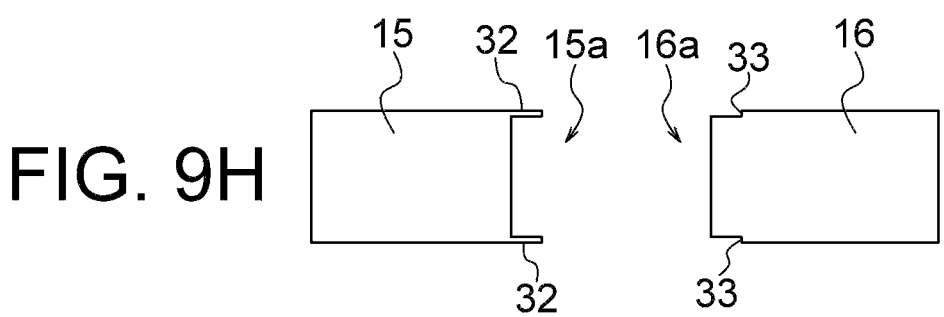
FIG. 9H is a view illustrating a schematic shape of the cross sections of the first plunger and the second plunger.

The shapes of the cutaway portion at the end portion 15a of the first plunger 15 and the end portion 16a of the second plunger 16 are not limited to the conical shape and may be various shapes. For example, as illustrated in FIG. 9F, the outer peripheral portion of the end portion 15a of the first plunger 15 may form a tapered cutter portion 32, and the central portion of the end portion 15a of the first plunger 15 may form a flat surface. Further, as illustrated in FIG. 9G, the outer peripheral portion of the end portion 15a of the first plunger 15 may form the tapered cutter portion 32, and the surface of the end portion 15a of the first plunger 15 may form, as a whole, a part of a sphere or an ellipsoid. Further, as illustrated in FIG. 9H, the outer peripheral portion of the end portion 15a of the first plunger 15 may form the cutter portion 32 formed of a thin projecting portion having a substantially constant thickness. The end portion 16a of the second plunger 16 illustrated in FIGS. 9F to 9H includes the receiving portion 33 that can be in close contact with the cutter portion 32 of the corresponding first plunger 15 without any gap.

Figure 9I:
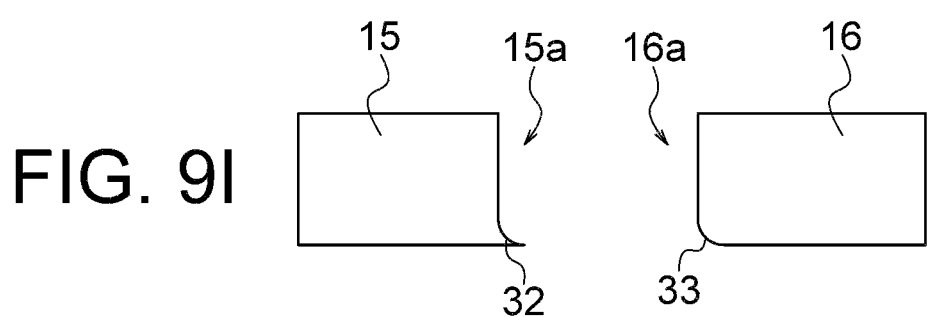
FIG. 9I is a view illustrating a schematic shape of the cross sections of the first plunger and the second plunger.

Further, the cutter portion 32 does not have to be provided in the entire outer peripheral portion of the end portion 15a of the first plunger 15, and may be provided only in a part of the outer peripheral portion (see FIG. 9I). In a case where the cutter portion 32 is provided only in a part of the outer peripheral portion of the end portion 15a of the first plunger 15 as described above, when the first plunger 15 moves in the internal space 12 of the peripheral wall portion 11, the position of the cutter portion 32 is determined so that the cutter portion 32 passes the area facing the first port 13 and/or the second port 14.

Further, while FIGS. 9C to 9I described above illustrate the case where the first plunger 15 has the cutter portion 32, the second plunger 16 may have the cutter portion 32. For example, the cutter portion 32 similar to the cutter portion 32 illustrated in FIGS. 9C to 9I may be formed in the second plunger 16. In such a case, the first plunger 15 preferably includes the receiving portion 33 that matches the cutter portion 32 formed in the second plunger 16.

Figure 9J:
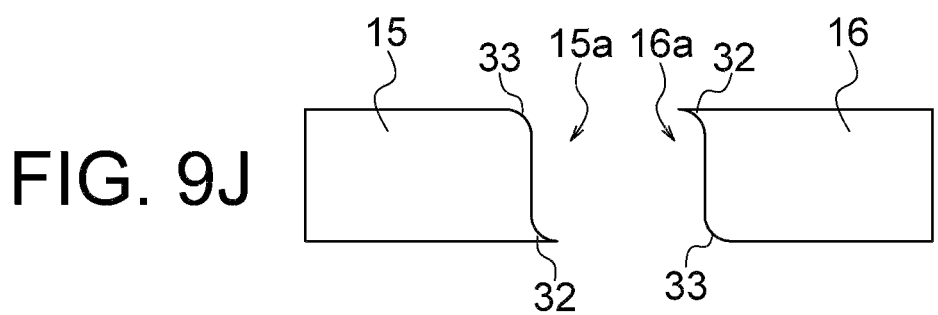
FIG. 9J is a view illustrating a schematic shape of the cross sections of the first plunger and the second plunger.

Further, both the first plunger 15 and the second plunger 16 may have the cutter portion 32. In this case, the first plunger 15 may include the receiving portion 33 that matches the cutter portion 32 of the second plunger 16, and the second plunger 16 may include the receiving portion 33 that matches the cutter portion 32 of the first plunger 15. For example, as illustrated in FIG. 9J, the cutter portion 32 and the receiving portion 33 may be formed at each of the end portion 15a of the first plunger 15 and the end portion 16a of the second plunger 16, and the cutter portion 32 of the first plunger 15 may engage with the receiving portion 33 of the second plunger 16, and the cutter portion 32 of the second plunger 16 may engage with the receiving portion 33 of the first plunger 15. When the cutter portion 32 and the receiving portion 33 are formed in both the first plunger 15 and the second plunger 16 as described above, the shape of the first plunger 15 can be the same as the shape of the second plunger 16. In this case, a single type of plunger can be used as the first plunger 15 and the second plunger 16.

As described above, the end portion 15a of the first plunger 15 and the end portion 16a of the second plunger 16 can have various shapes, and the shapes of the end portions 15a and 16a of the first plunger 15 and the second plunger 16 (that is, positions and shapes of cutter portion 32 and receiving portion 33) are appropriately determined according to the behavior of the first plunger 15 and the second plunger 16 required in the quantitative division method described above (first driving state to fourth driving state). In particular, it is preferable to determine the shape, size, and arrangement of the cutter portion 32 according to the shape, size, and arrangement of the first port 13 and the second port 14. For example, the cutter portion 32 for cutting the paste ingredient 100 at a position corresponding to the boundary between the first port 13 and the internal space 12 is disposed so as to pass the area facing the first port 13 when the driving state shifts from the second driving state to the third driving state. Further, the cutter portion 32 for cutting the paste ingredient 100 at a position corresponding to the boundary between the second port 14 and the internal space 12 is disposed so as to pass the area facing the second port 14 when the driving state shifts from the third driving state to the fourth driving state.

As an example, as illustrated in FIG. 9J, an example of the behavior of the first plunger 15 and the second plunger 16 in a case where each of the end portion 15a of the first plunger 15 and the end portion 16a of the second plunger 16 has the cutter portion 32 and the receiving portion 33 will be described below.

FIGS. 10A to 10D are views illustrating an example of the behavior of the first plunger 15 and the second plunger 16. The basic structure of the quantitative division devices 10 illustrated in FIGS. 10A to 10D is common to that of the quantitative division device 10 illustrated in FIG. 1, but a plurality of seal members 36 composed of so-called O-rings are provided on the inner wall surface 11a of the peripheral wall portion 11. Specifically, a plurality of the seal members 36 are provided so that each of the first port 13 and the second port 14 is present between the seal members 36 in the first direction D1, and in the examples illustrated in FIGS. 10A to 10D, the seal member 36 is disposed at three locations. If a strict seal between the first port 13 and the second port 14 is not required, the seal member 36 does not have to be provided between the first port 13 and the second port 14. (See FIG. 10E). Further, as described above, when each of the first plunger 15 and the second plunger 16 is provided so as to be movable in the first direction D1 while being in close contact with the inner wall surface 11a of the peripheral wall portion 11 and the paste ingredient 100 basically does not leak from between each of the first plunger 15 and the second plunger 16 and the peripheral wall portion 11, the seal member 36 does not have to be provided (see FIG. 10F).

Figure 10A:
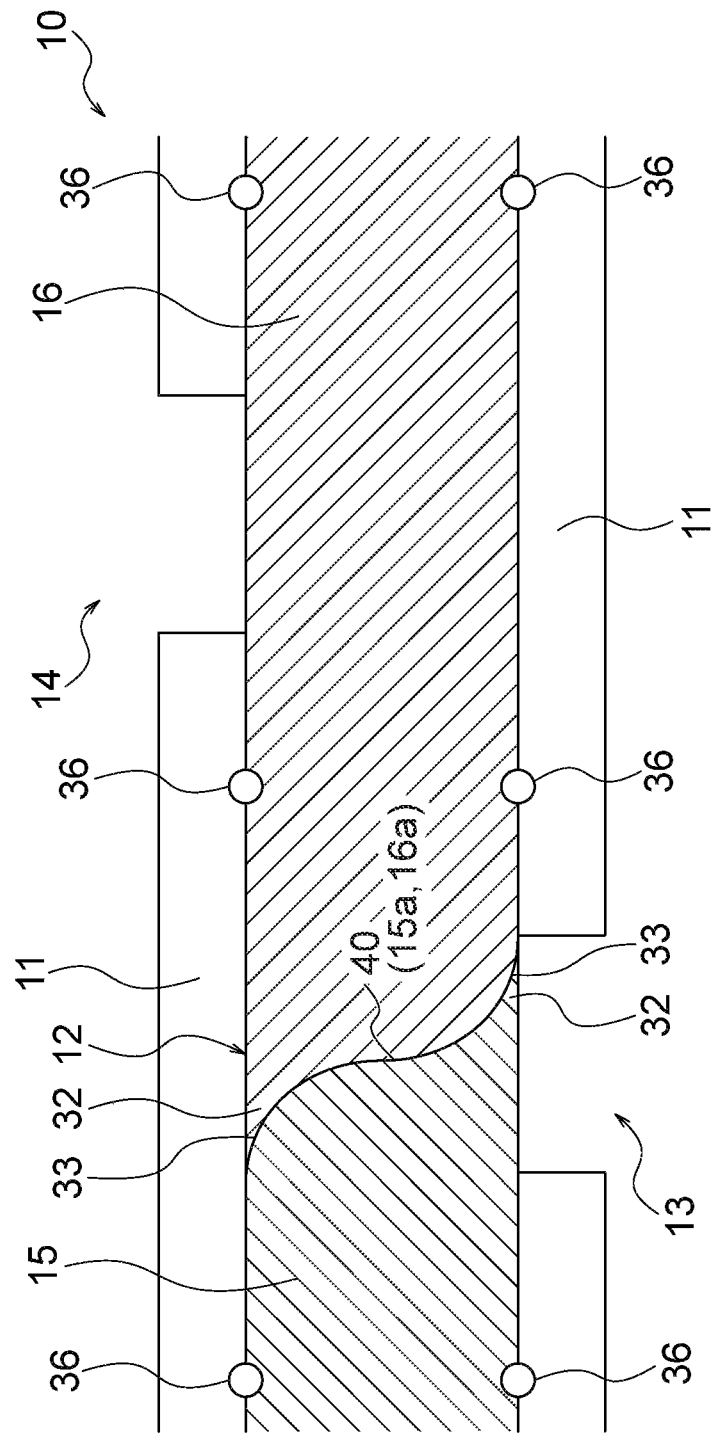
FIG. 10A is a view illustrating an example of a behavior of the first plunger and the second plunger.

First, in the first driving state, as illustrated in FIG. 10A, the first plunger 15 and the second plunger 16 are arranged so that the contact surface 40 between the first plunger 15 and the second plunger 16 is located at a position facing the first port 13. In the example illustrated in FIG. 10A, the first port 13 is entirely covered by the first plunger 15 in the first driving state.

Figure 10B:
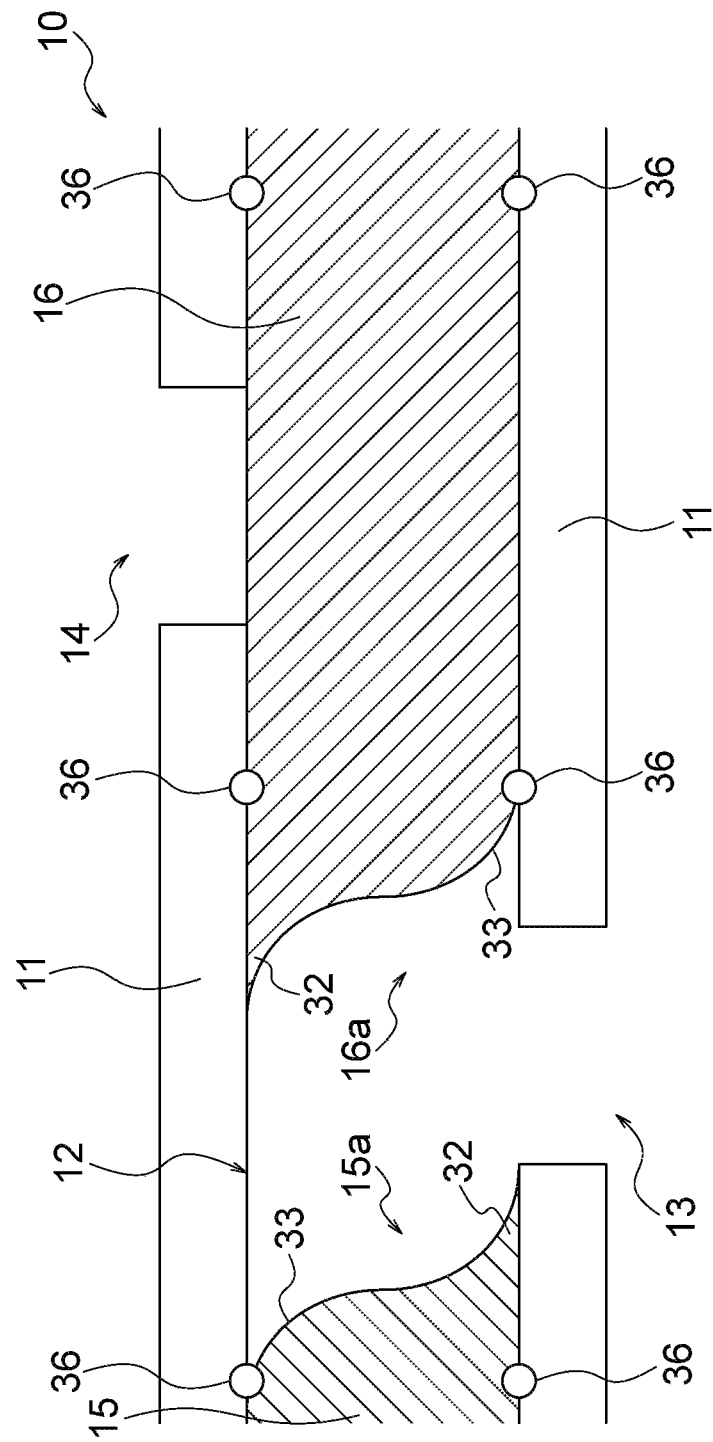
FIG. 10B is a view illustrating an example of the behavior of the first plunger and the second plunger.

In the second driving state, as illustrated in FIG. 10B, the first plunger 15 and the second plunger 16 are then arranged so as to be separated from each other. In the example illustrated in FIG. 10B, both the first plunger 15 and the second plunger 16 are moved in opposite directions to each other. However, only the first plunger 15 may be moved. As a result, the paste ingredient 100 (not illustrated) is filled in the internal space 12 between the first plunger 15 and the second plunger 16.

Figure 10C:
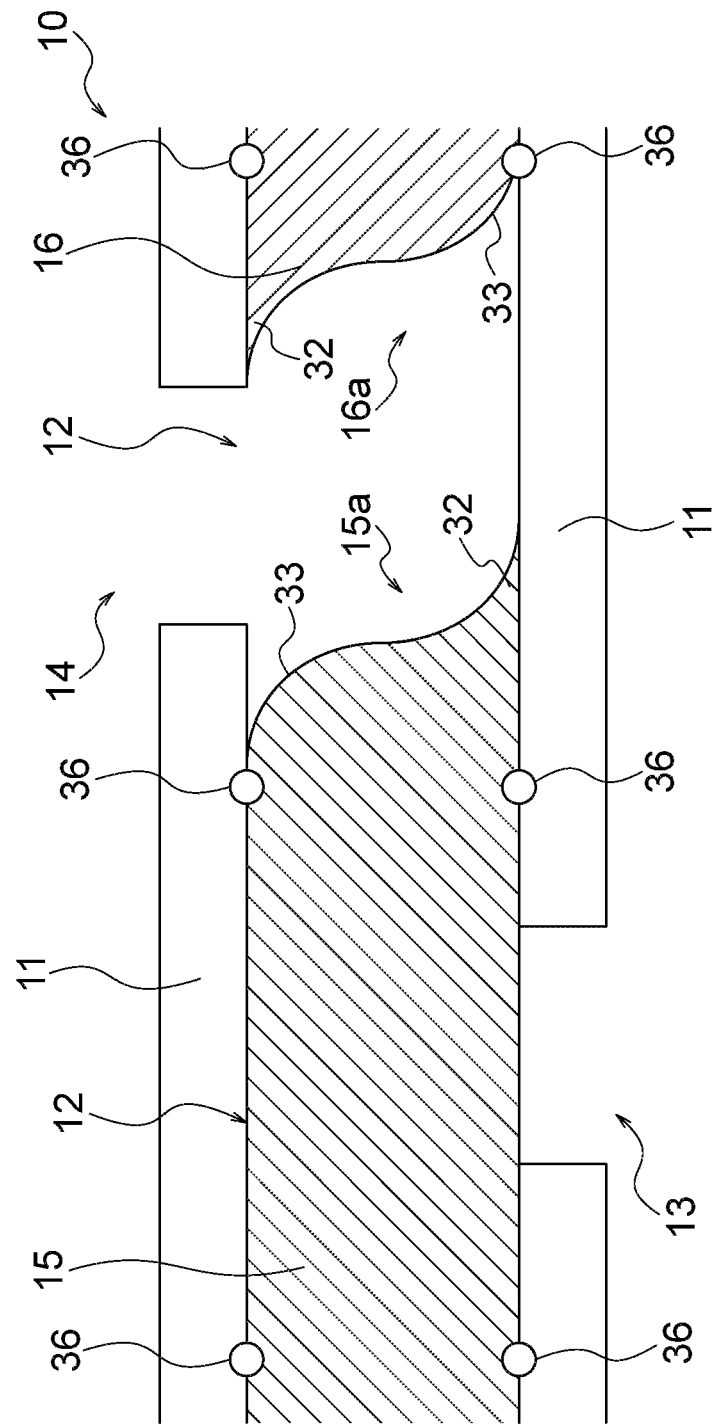
FIG. 10C is a view illustrating an example of the behavior of the first plunger and the second plunger.

In the third driving state, as illustrated in FIG. 10C, at least a part of the paste ingredient 100 (not illustrated) between the first plunger 15 and the second plunger 16 is disposed so as to face the second port 14 while the first plunger 15 is kept separated from the second plunger 16. In the example illustrated in FIG. 10C, the entire area of the second port 14 faces the paste ingredient 100 filled between the first plunger 15 and the second plunger 16.

Figure 10D:
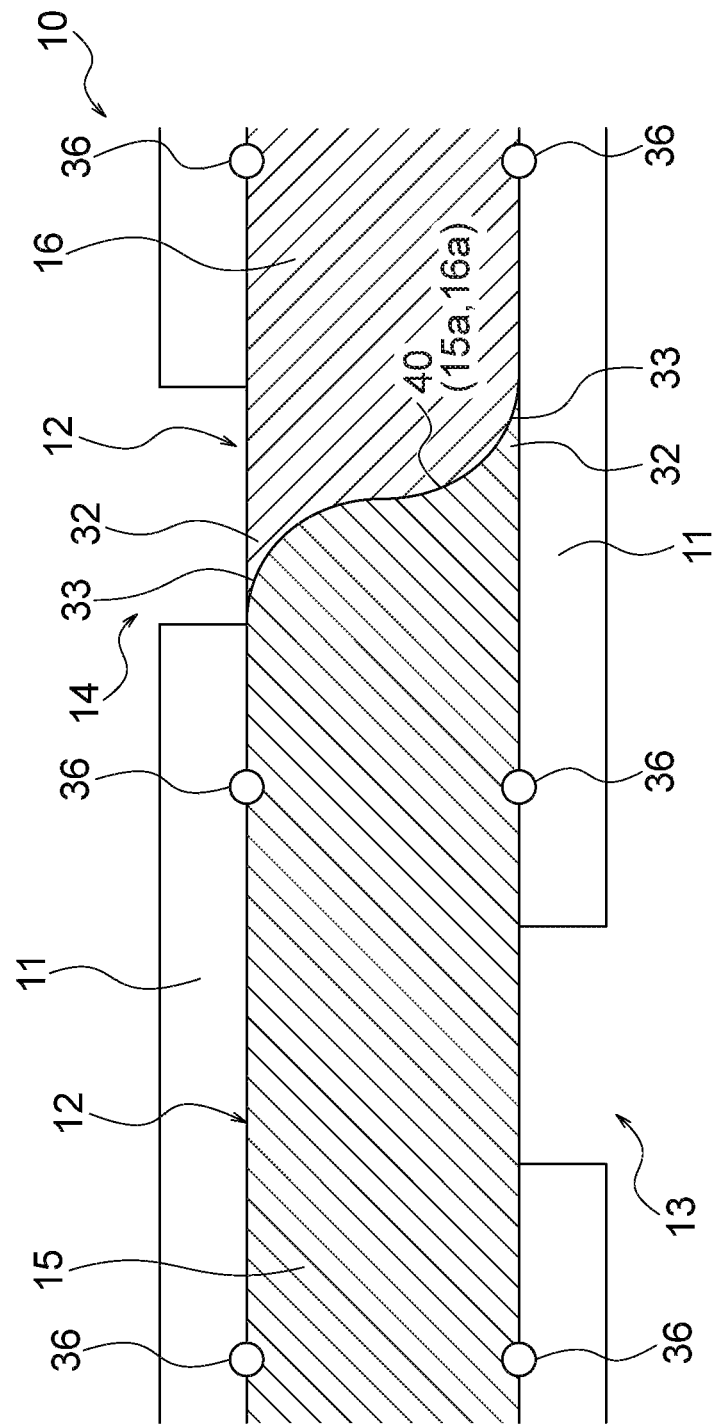
FIG. 10D is a view illustrating an example of the behavior of the first plunger and the second plunger.
Figure 10E:
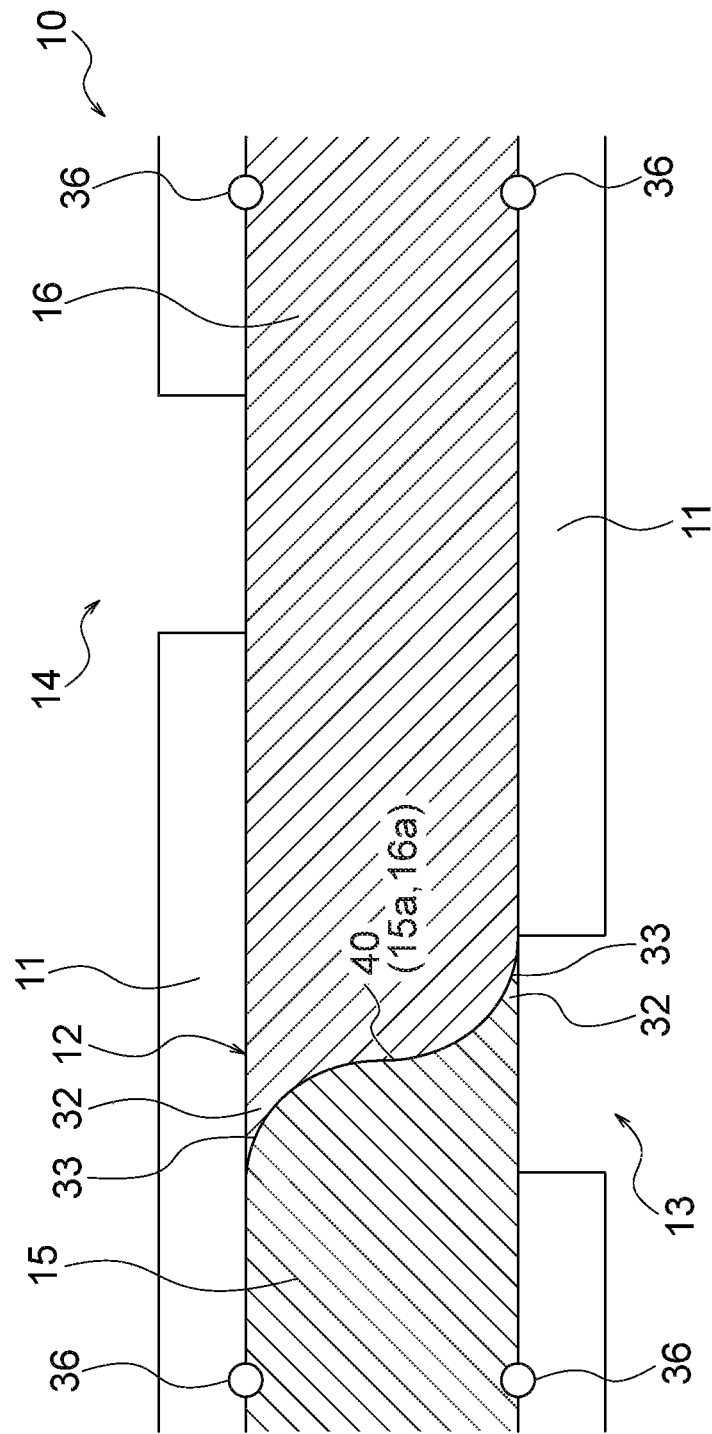
FIG. 10E is a view illustrating a modification of a seal structure.
Figure 10F:
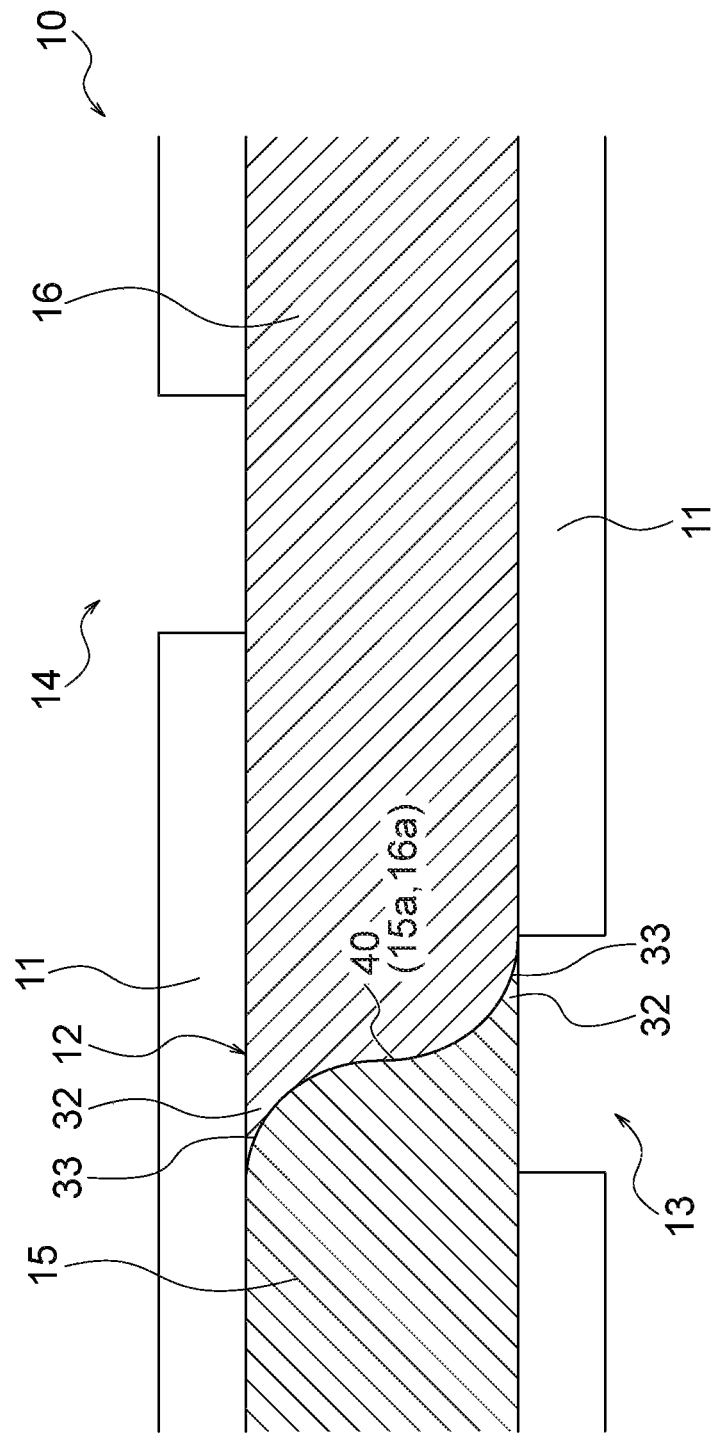
FIG. 10F is a view illustrating another modification of the seal structure (example in which seal member is not provided).

In the fourth driving state, as illustrated in FIG. 10D, the first plunger 15 and the second plunger 16 are brought close to each other, and the first plunger 15 and the second plunger 16 are arranged so that the contact surface 40 between the first plunger 15 and the second plunger 16 is located at a position facing the second port 14. In the example illustrated in FIG. 10D, both the first plunger 15 and the second plunger 16 are moved, and the entire area of the second port 14 is covered by the second plunger 16 in the fourth driving state. However, only one of the first plunger 15 and the second plunger 16 (for example, only second plunger 16 in example illustrated in FIG. 10D) may be moved. Alternatively, the entire area of the second port 14 may be covered by the first plunger 15 in the fourth driving state, or may be covered by both the first plunger 15 and the second plunger 16 in the fourth driving state. As a result, the paste ingredient 100 is pushed from the internal space 12 into the second port 14.

When the cutter portion 32 is formed in the first plunger 15 and/or the second plunger 16, the distal end of the cutter portion 32 may be located inside the outermost peripheral position of the corresponding first plunger 15 or second plunger 16 in a direction perpendicular to the first direction D1. That is, in a state where the first plunger 15 and the second plunger 16 are arranged in the internal space 12 of the peripheral wall portion 11, the distal end of the cutter portion 32 formed at the end portion 15a of the first plunger 15 and/or the end portion 16a of the second plunger 16 may be disposed at a position of not contacting the inner wall surface 11a of the peripheral wall portion 11 and the seal member 36. In this case, the first plunger 15 and the second plunger 16 can be smoothly moved in the internal space 12 of the peripheral wall portion 11 without the cutter portion 32 being caught by the inner wall surface 11a of the peripheral wall portion 11 or the seal member 36.

Figure 11A:
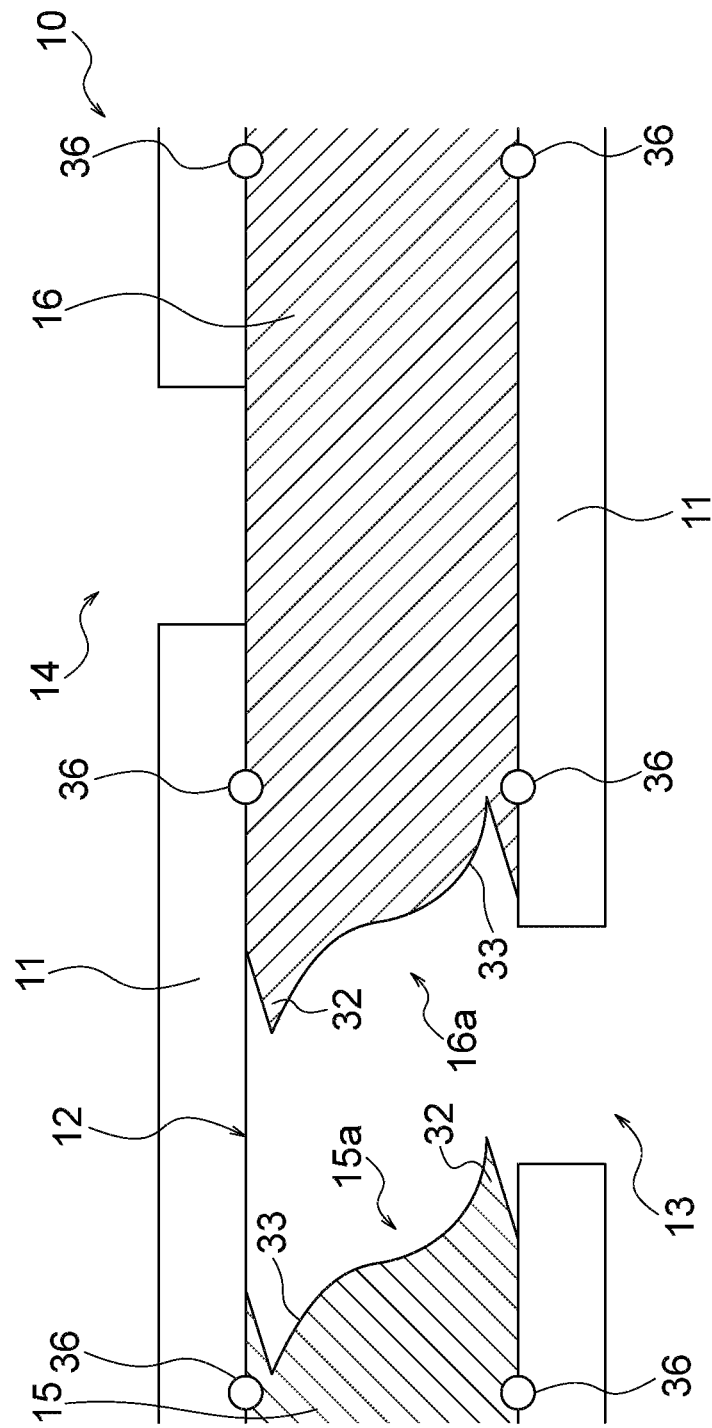
FIG. 11A is a view illustrating a modification of the first plunger and the second plunger illustrated in FIG. 9J, and illustrates the second driving state.
Figure 11B:
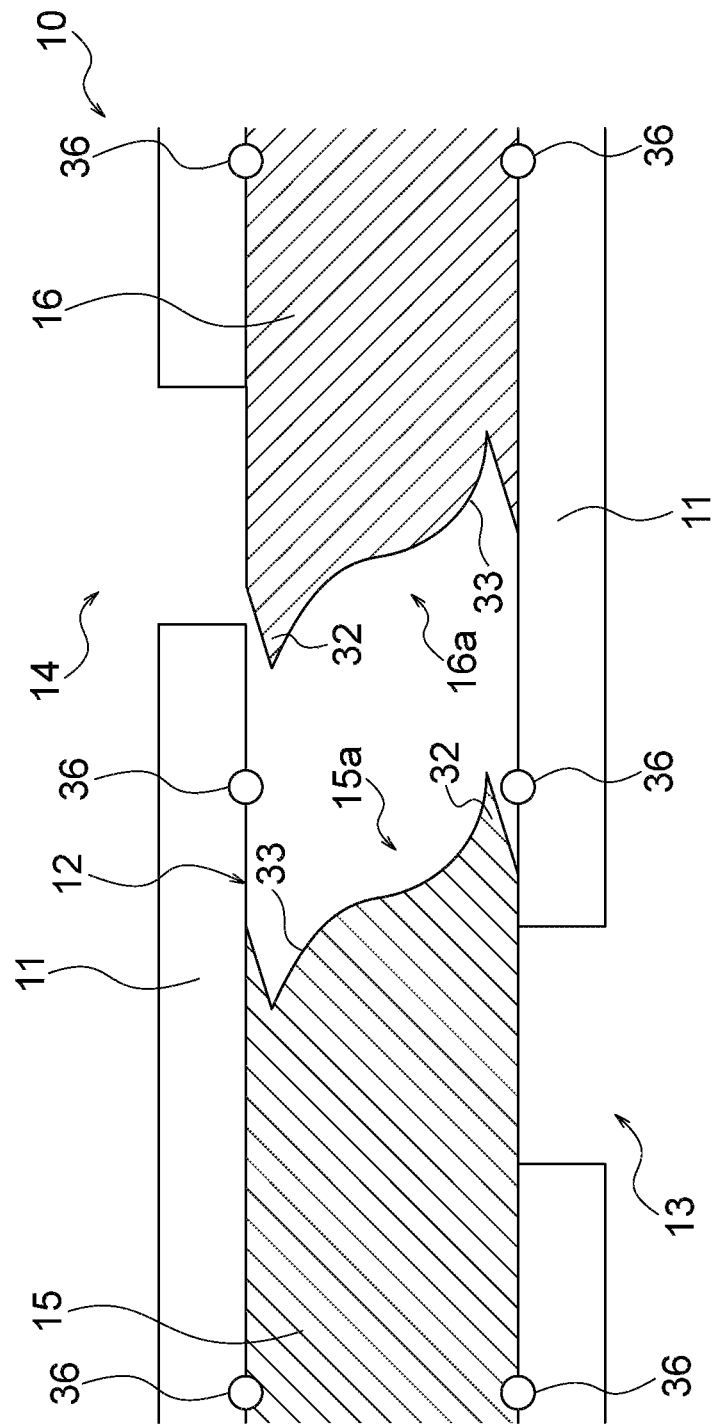
FIG. 11B is a view illustrating another modification of the first plunger and the second plunger illustrated in FIG. 9J, and illustrates a state in the middle of shifting from the second driving state to the third driving state.

FIGS. 11A and 11B are views illustrating a modification of the first plunger 15 and the second plunger 16 illustrated in FIG. 9J, FIG. 11A illustrates the second driving state, and FIG. 11B illustrates a state in the middle of shifting from the second driving state to the third driving state. Each of the first plunger 15 and the second plunger 16 illustrated in FIGS. 11A and 11B has the cutter portion 32 and the receiving portion 33, and is arranged at a position where the cutter portion 32 (particularly distal end portion) does not contact the inner wall surface 11a of the peripheral wall portion 11 and the seal member 36.

Figure 12A:
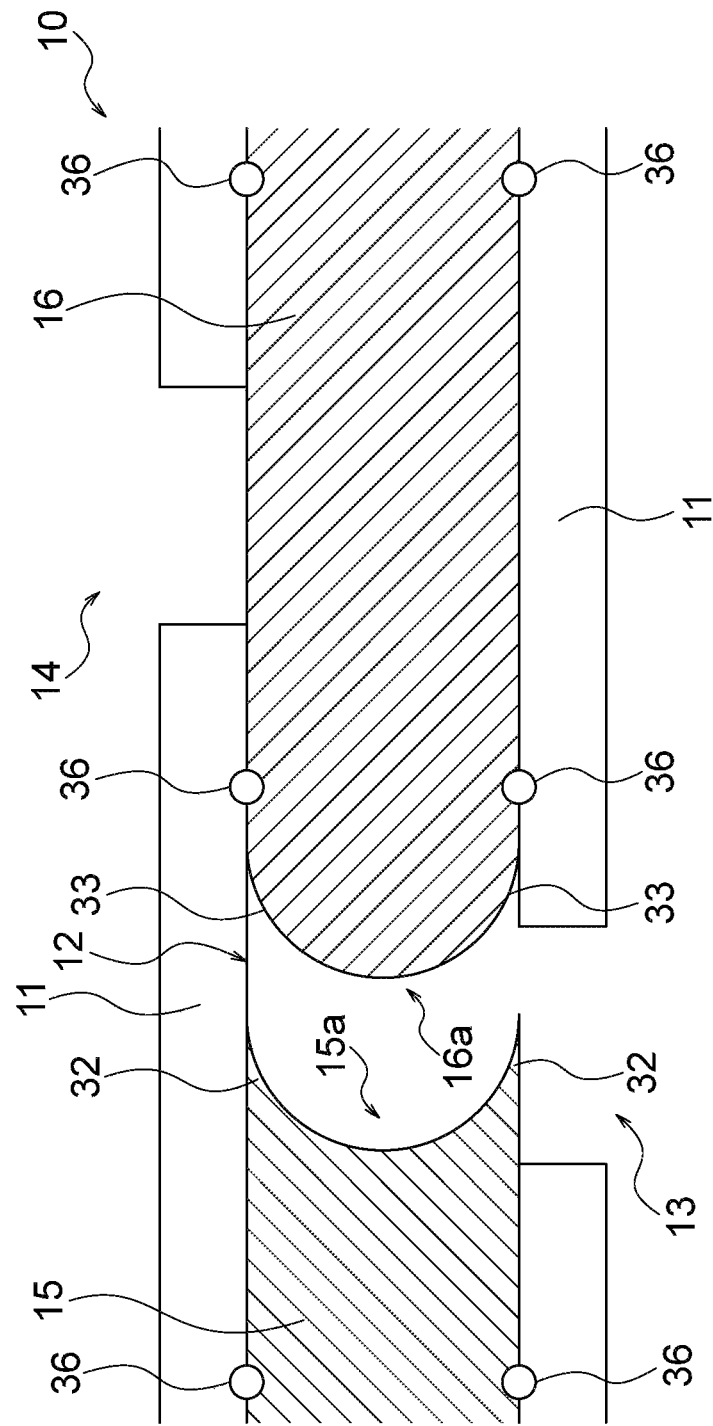
FIG. 12A is a view illustrating the first plunger and the second plunger illustrated in FIG. 9G, and illustrates a state in the middle of shifting from the second driving state to the third driving state.
Figure 12B:
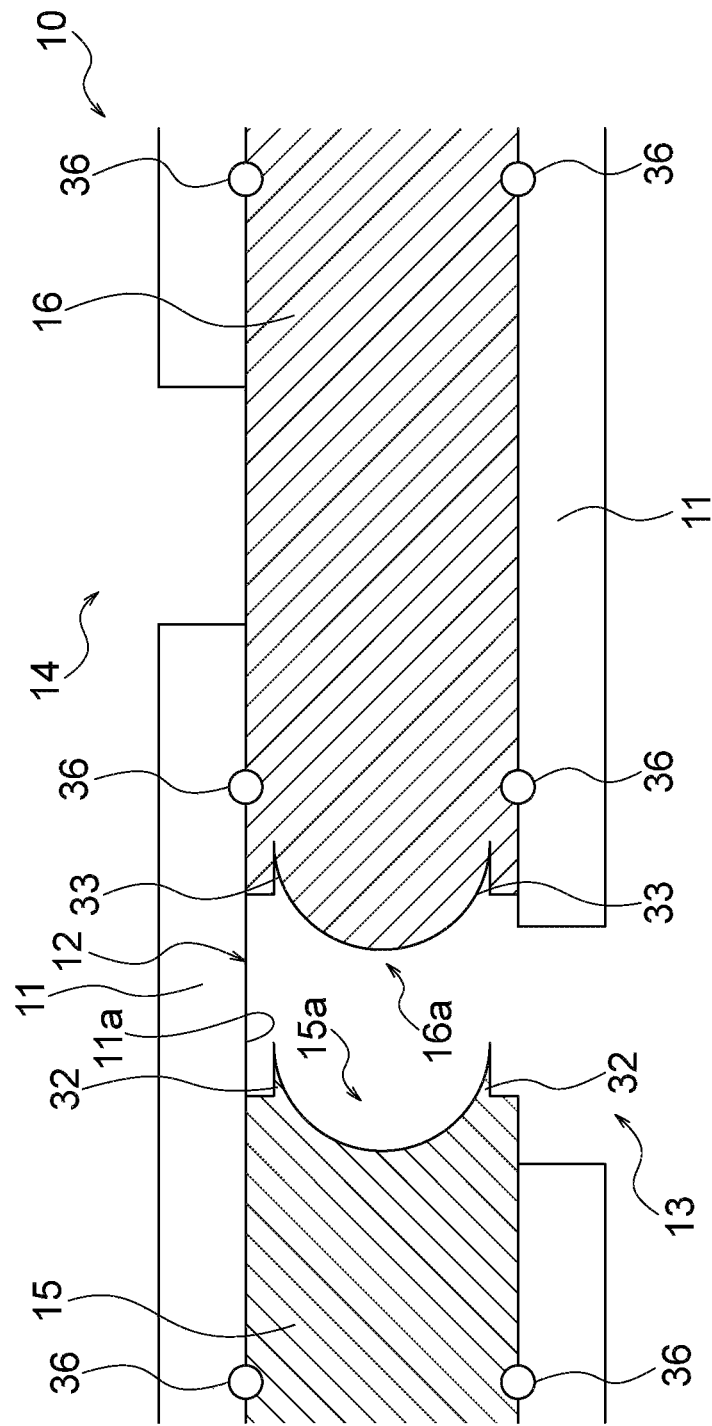
FIG. 12B is a view illustrating a modification of the first plunger and the second plunger illustrated in FIG. 9G, and illustrates a state in the middle of shifting from the second driving state to the third driving state.
Figure 12C:
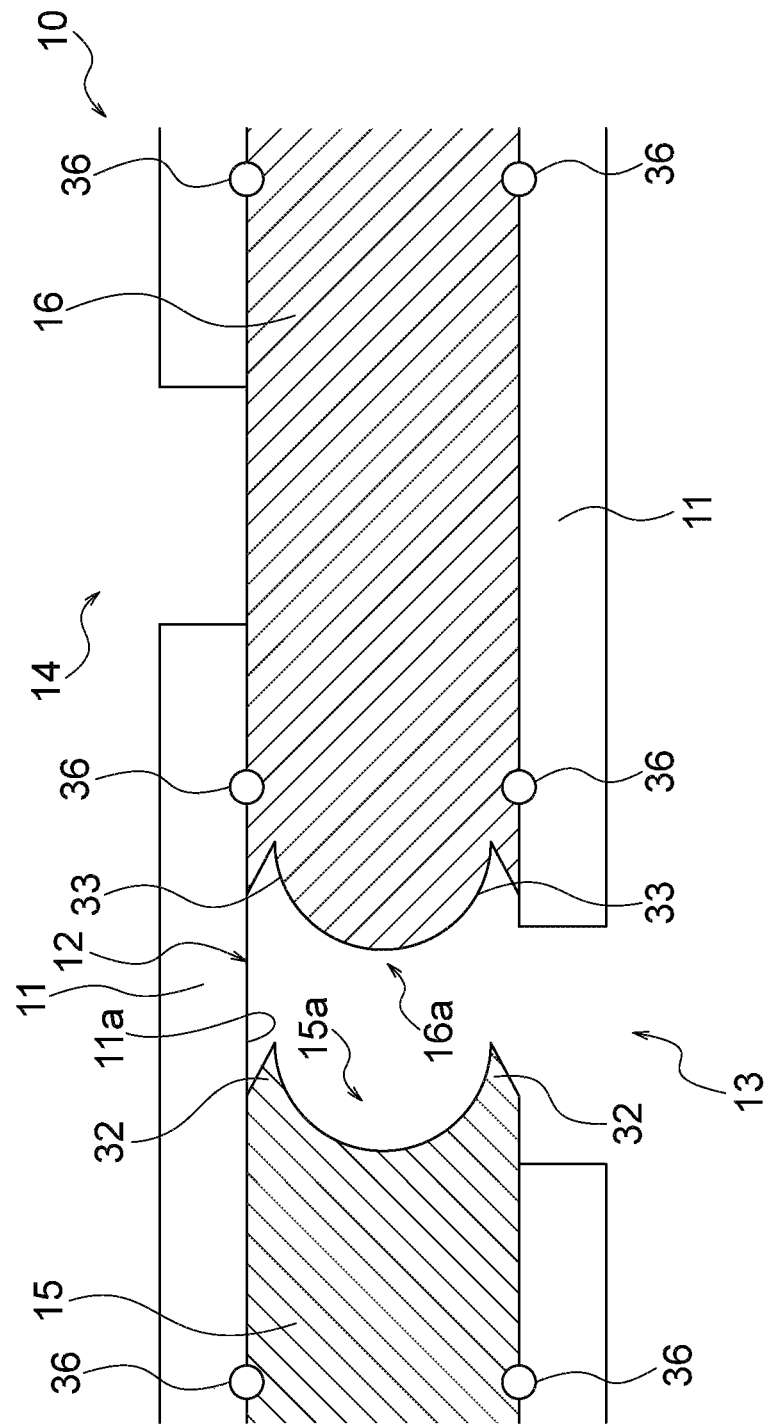
FIG. 12C is a view illustrating another modification of the first plunger and the second plunger illustrated in FIG. 9G, and illustrates a state in the middle of shifting from the second driving state to the third driving state.

FIG. 12A is a view illustrating the first plunger 15 and the second plunger 16 illustrated in FIG. 9G, and illustrates a state in the middle of shifting from the second driving state to the third driving state. FIG. 12B is a view illustrating a modification of the first plunger 15 and the second plunger 16 illustrated in FIG. 9G, and illustrates a state in the middle of shifting from the second driving state to the third driving state. FIG. 12C is a view illustrating another modification of the first plunger 15 and the second plunger 16 illustrated in FIG. 9G, and illustrates a state in the middle of shifting from the second driving state to the third driving state. The cutter portion 32 illustrated in FIG. 12A is disposed at a position of contacting the inner wall surface 11a of the peripheral wall portion 11 and the seal member 36, whereas the cutter portion 32 illustrated in FIGS. 12B and 12C is disposed at a position of not contacting the inner wall surface 11a of the peripheral wall portion 11 and the seal member 36. The structure of the cutter portion 32 disposed at the position of not contacting the inner wall surface 11a of the peripheral wall portion 11 and the seal member 36 is not particularly limited, and for example, as illustrated in FIG. 12B, the outer peripheral surface of the cutter portion 32 (that is, outer peripheral surface facing inner wall surface 11a of peripheral wall portion 11) may extend in parallel with the first direction D1, or as illustrated in FIG. 12C, the outer peripheral surface of the cutter portion 32 may include an inclined surface to be non-parallel to the first direction D1.

Figure 13A:
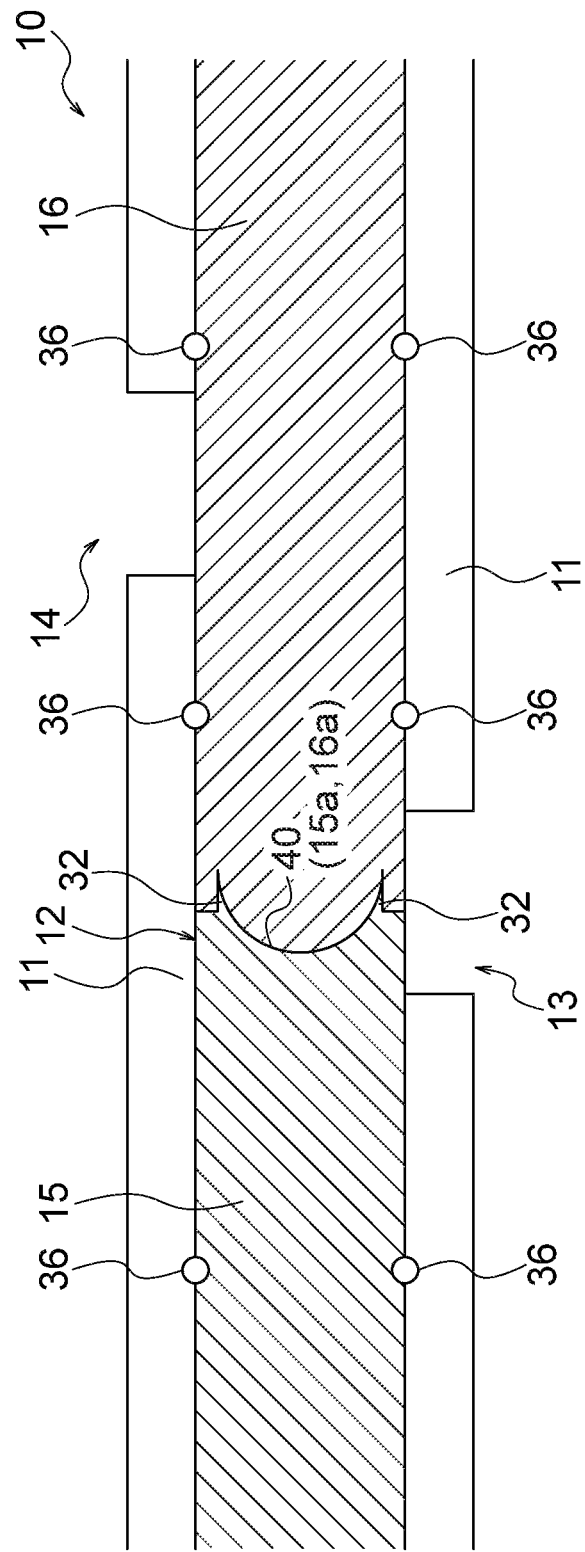
FIG. 13A is a view illustrating an example of a behavior of the first plunger and the second plunger illustrated in FIG. 12B.

FIGS. 13A to 13D are views illustrating an example of the behavior of the first plunger 15 and the second plunger 16 illustrated in FIG. 12B. In the quantitative division device 10 illustrated in FIG. 12B in the first driving state, as illustrated in FIG. 13A, the first plunger 15 and the second plunger 16 are arranged so that the contact surface 40 between the first plunger 15 and the second plunger 16 is located at a position facing the first port 13. In the example illustrated in FIG. 13A, the entire area of the first port 13 is covered by both the first plunger 15 and the second plunger 16 in the first driving state.

Figure 13B:
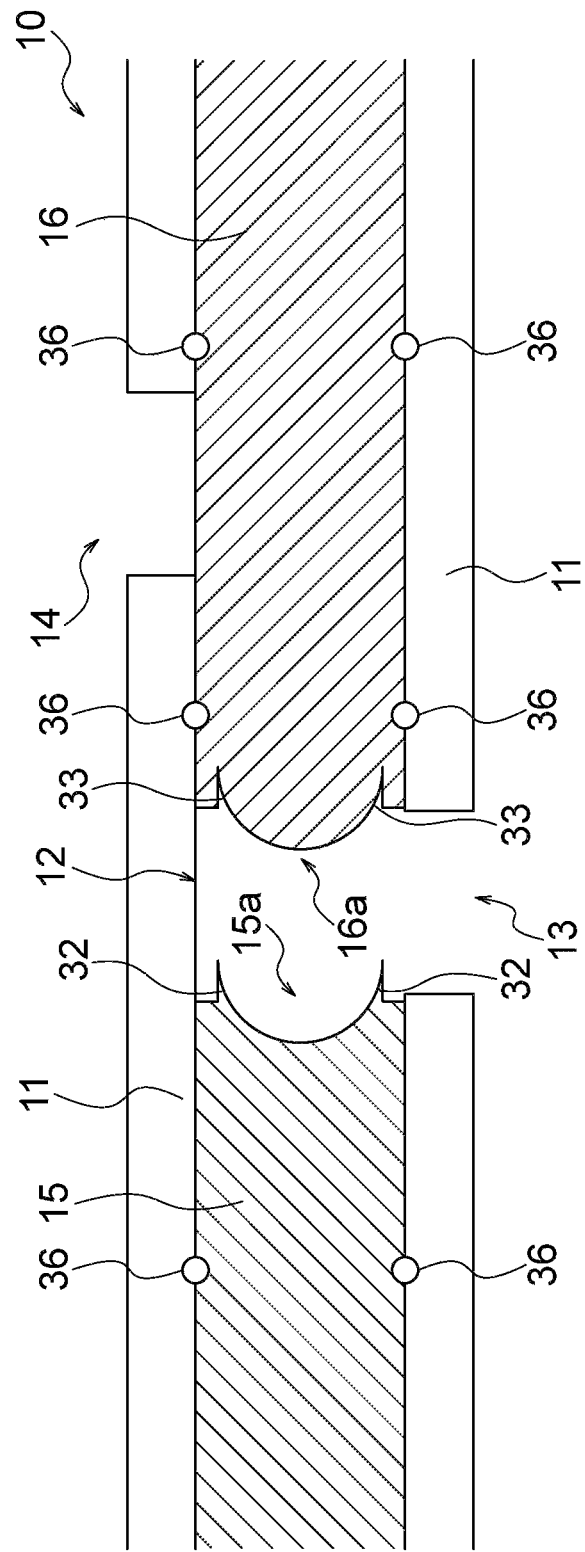
FIG. 13B is a view illustrating an example of the behavior of the first plunger and the second plunger illustrated in FIG. 12B.

In the second driving state, as illustrated in FIG. 13B, the first plunger 15 and the second plunger 16 are then arranged at positions separated from each other. In the example illustrated in FIG. 13B, both the first plunger 15 and the second plunger 16 are moved in opposite directions to each other. As a result, the paste ingredient 100 (not illustrated) is filled in the internal space 12 between the first plunger 15 and the second plunger 16.

Figure 13C:
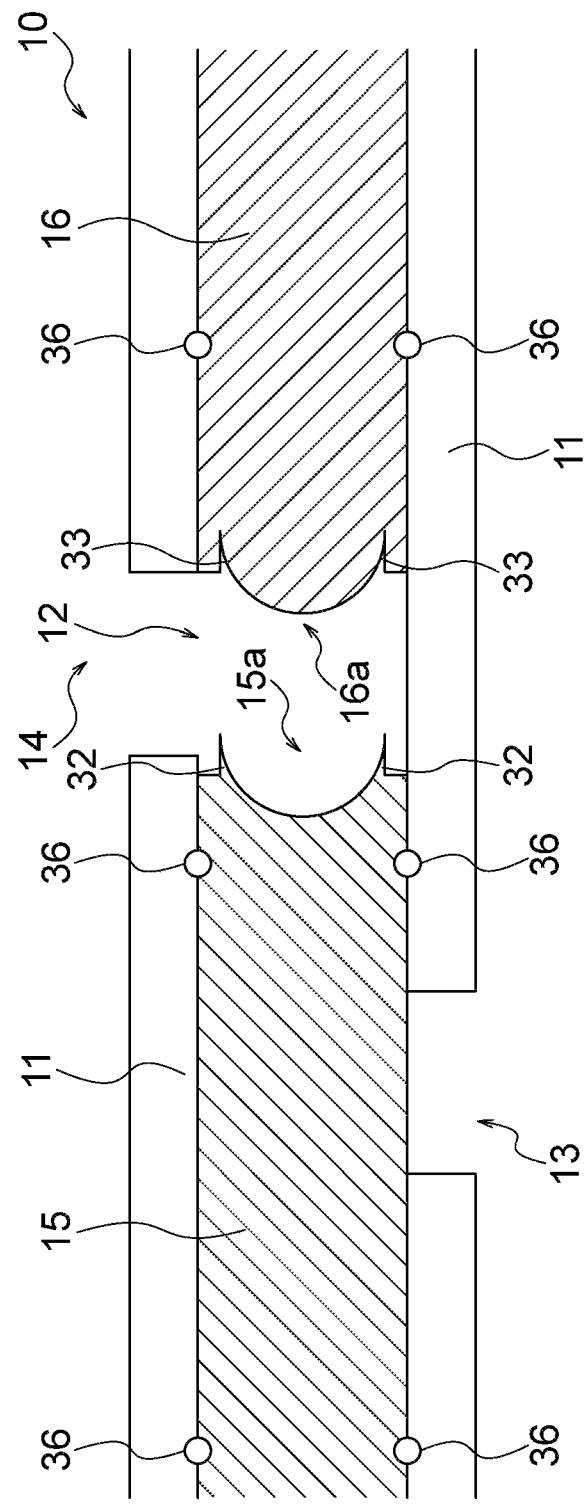
FIG. 13C is a view illustrating an example of the behavior of the first plunger and the second plunger illustrated in FIG. 12B.

In the third driving state, as illustrated in FIG. 13C, at least a part of the paste ingredient 100 (not illustrated) between the first plunger 15 and the second plunger 16 is disposed so as to face the second port 14 while the first plunger 15 is kept separated from the second plunger 16. In the example illustrated in FIG. 13C, the entire area of the second port 14 faces the paste ingredient 100 between the first plunger 15 and the second plunger 16.

Figure 13D:
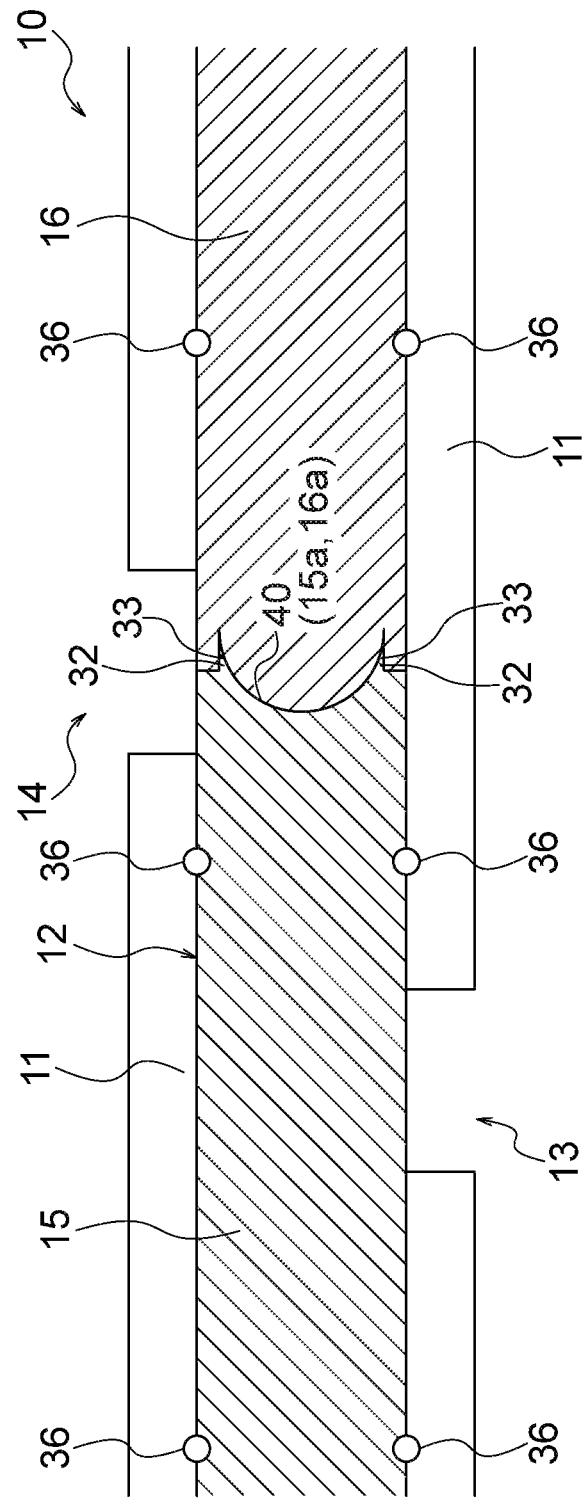
FIG. 13D is a view illustrating an example of the behavior of the first plunger and the second plunger illustrated in FIG. 12B.

In the fourth driving state, as illustrated in FIG. 13D, the first plunger 15 and the second plunger 16 are brought close to each other, and the first plunger 15 and the second plunger 16 are arranged so that the contact surface 40 between the first plunger 15 and the second plunger 16 is located at a position facing the second port 14. In the example illustrated in FIG. 13D, both the first plunger 15 and the second plunger 16 are moved, and the entire area of the second port 14 is covered by both the first plunger 15 and the second plunger 16 in the fourth driving state. As a result, the paste ingredient 100 is pushed from the internal space 12 into the second port 14.

Specific Example of Quantitative Division Device

Next, a specific example of the quantitative division device 10 will be described. The quantitative division device 10 to be described below is only an example, and the quantitative division device 10 described above can be configured by combining any devices.

Figure 14:
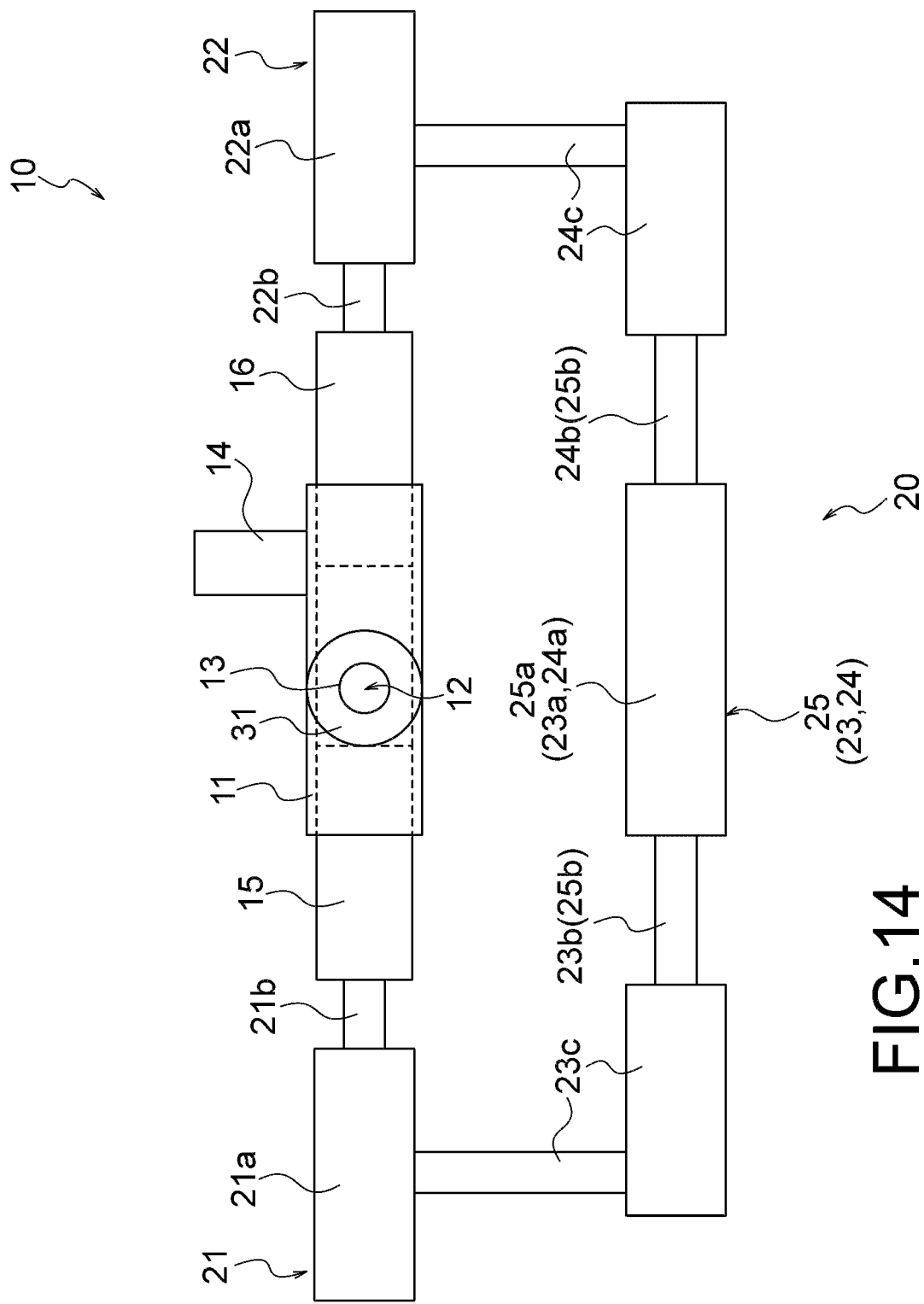
FIG. 14 is a plan view illustrating an example of the quantitative division device.

FIG. 14 is a plan view illustrating an example of the quantitative division device 10. The quantitative division device 10 illustrated in FIG. 14 has the configuration illustrated in FIG. 3 (in particular, configuration including common coupling drive unit 25). Elements that are the same as or similar to the elements described above on the basis FIG. 1 and the like are designated by the same reference numerals, and detailed description thereof will be omitted.

The quantitative division device 10 illustrated in FIG. 14 includes the peripheral wall portion 11, the first plunger 15, and the second plunger 16. The peripheral wall portion 11 has the internal space 12, the first port 13, and the second port 14. The first port 13 extends in the vertical direction, and the second port 14 extends in a horizontal direction. The first plunger drive unit 21 (in particular, first air cylinder rod 21b) composed of an air cylinder is coupled to the first plunger 15. The second plunger drive unit 22 (in particular, second air cylinder rod 22b) composed of an air cylinder is coupled to the second plunger 16. Each of the first plunger drive unit 21 and the second plunger drive unit 22 includes a discharge amount adjustment gauge (not illustrated). The discharge amount adjustment gauge can adjust the basic positions of the corresponding first air cylinder rod 21b and second air cylinder rod 22b to change the maximum projection amount of the corresponding first air cylinder rod 21b and second air cylinder rod 22b.

The first coupling drive unit 23 coupled to the first plunger drive unit 21 and the second coupling drive unit 24 coupled to the second plunger drive unit 22 are configured with the common coupling drive unit 25. The common coupling drive unit 25 illustrated in FIG. 14 is composed of an air cylinder, and has a common air cylinder tube 25a and a common air cylinder rod 25b. The common air cylinder tube 25a functions as a first coupling drive tube 23a of the first coupling drive unit 23 and a second coupling drive tube 24a of the second coupling drive unit 24. The common air cylinder rod 25b projects horizontally from the common air cylinder tube 25a, and the amount of projection of the common air cylinder rod 25b from the common air cylinder tube 25a is variable. The common air cylinder rod 25b illustrated in FIG. 14 is composed of a first coupling drive rod 23b and a second coupling drive rod 24b that project from the common air cylinder tube 25a in opposite directions. The first coupling drive rod 23b and the second coupling drive rod 24b are integrally provided. When one of the first coupling drive rod 23b and the second coupling drive rod 24b projects from the common air cylinder tube 25a, the other retracts toward the common air cylinder tube 25a.

The first coupling drive rod 23b is fixed to a first air cylinder tube 21a via a first coupling portion 23c, whereas the second coupling drive rod 24b is fixed to a second air cylinder tube 22a via a second coupling portion 24c. Consequently, the distance in the first direction D1 between the first coupling portion 23c and the second coupling portion 24c is constant regardless of the driving state of the common coupling drive unit 25. Further, the distance in the first direction D1 between the first air cylinder tube 21a and the second air cylinder tube 22a is also constant regardless of the driving state of the common coupling drive unit 25.

In the quantitative division device 10 with the configuration described above, when the first plunger 15 and the second plunger 16 are shifted from the first driving state to the second driving state, the first plunger drive unit 21 and/or the second plunger drive unit 22 moves the first plunger 15 and/or the second plunger 16 under the control of the control unit 30. Specifically, the amount of projection of the first air cylinder rod 21b from the first air cylinder tube 21a and/or the amount of projection of the second air cylinder rod 22b from the second air cylinder tube 22a is adjusted.

The state of the common coupling drive unit 25 is maintained while the first plunger 15 and the second plunger 16 are shifted from the first driving state to the second driving state, and the amount of projection of each of the first coupling drive rod 23b and the second coupling drive rod 24b from the common air cylinder tube 25a does not change.

Meanwhile, when the first plunger 15 and the second plunger 16 are shifted from the second driving state to the third driving state, the common coupling drive unit 25 integrally moves the first plunger drive unit 21, the first plunger 15, the second plunger drive unit 22, and the second plunger 16 under the control of the control unit 30. In the example illustrated in FIG. 14, since the second port 14 is provided on the right side of the first port 13, the first coupling drive rod 23b is retracted to the common air cylinder tube 25a, and the amount of projection of the second coupling drive rod 24b from the common air cylinder tube 25a is increased. The state of the first plunger drive unit 21 and the second plunger drive unit 22 is maintained while the first plunger 15 and the second plunger 16 are shifted from the second driving state to the third driving state, and the amount of projection of each of the first air cylinder rod 21b and the second air cylinder rod 22b does not change. As a result, the first plunger 15 and the second plunger 16 can be brought in the third driving state while the distance between the first plunger 15 and the second plunger 16 in the second driving state is maintained.

Next, when the first plunger 15 and the second plunger 16 are shifted from the third driving state to the fourth driving state, the first plunger drive unit 21 and/or the second plunger drive unit 22 moves the first plunger 15 and/or the second plunger 16 under the control of the control unit 30.

Specifically, the amount of projection of the first air cylinder rod 21b from the first air cylinder tube 21a and/or the amount of projection of the second air cylinder rod 22b from the second air cylinder tube 22a is adjusted. The state of the common coupling drive unit 25 is maintained while the first plunger 15 and the second plunger 16 are shifted from the third driving state to the fourth driving state, and the amount of projection of each of the first coupling drive rod 23b and the second coupling drive rod 24b from the common air cylinder tube 25a does not change.

When the first plunger 15 and the second plunger 16 are shifted from the fourth driving state to the first driving state, the common coupling drive unit 25 integrally moves the first plunger drive unit 21, the first plunger 15, the second plunger drive unit 22, and the second plunger 16 under the control of the control unit 30. In the example illustrated in FIG. 14, since the first port 13 is provided on the left side of the second port 14, the amount of projection of the first coupling drive rod 23b from the common air cylinder tube 25a is increased, and the second coupling drive rod 24b is retracted to the common air cylinder tube 25a. The state of the first plunger drive unit 21 and the second plunger drive unit 22 is maintained while the first plunger 15 and the second plunger 16 are shifted from the fourth driving state to the first driving state, and the amount of projection of each of the first air cylinder rod 21b and the second air cylinder rod 22b does not change. As a result, the first plunger 15 and the second plunger 16 can be brought in the first driving state while the distance or contact between the first plunger 15 and the second plunger 16 in the fourth driving state is maintained. Consequently, when the first plunger 15 and the second plunger 16 are in close contact with each other in the fourth driving state, the first plunger 15 and the second plunger 16 can be brought into close contact with each other even in the first driving state.

With the configuration illustrated in FIG. 14 as described above, the drive unit 20 can be composed of only an air cylinder without using an expensive device such as a servomotor. Further, the control for driving the drive unit 20 can be executed by a relatively simple method, and the control unit 30 can be composed of a relatively simple device.

Specific Example of Quantitative Division Unit

The quantitative division unit 5 that feeds a predetermined amount of the paste ingredient 100 to a subsequent stage may include one or a plurality of the quantitative division devices 10 described above.

Figure 15:
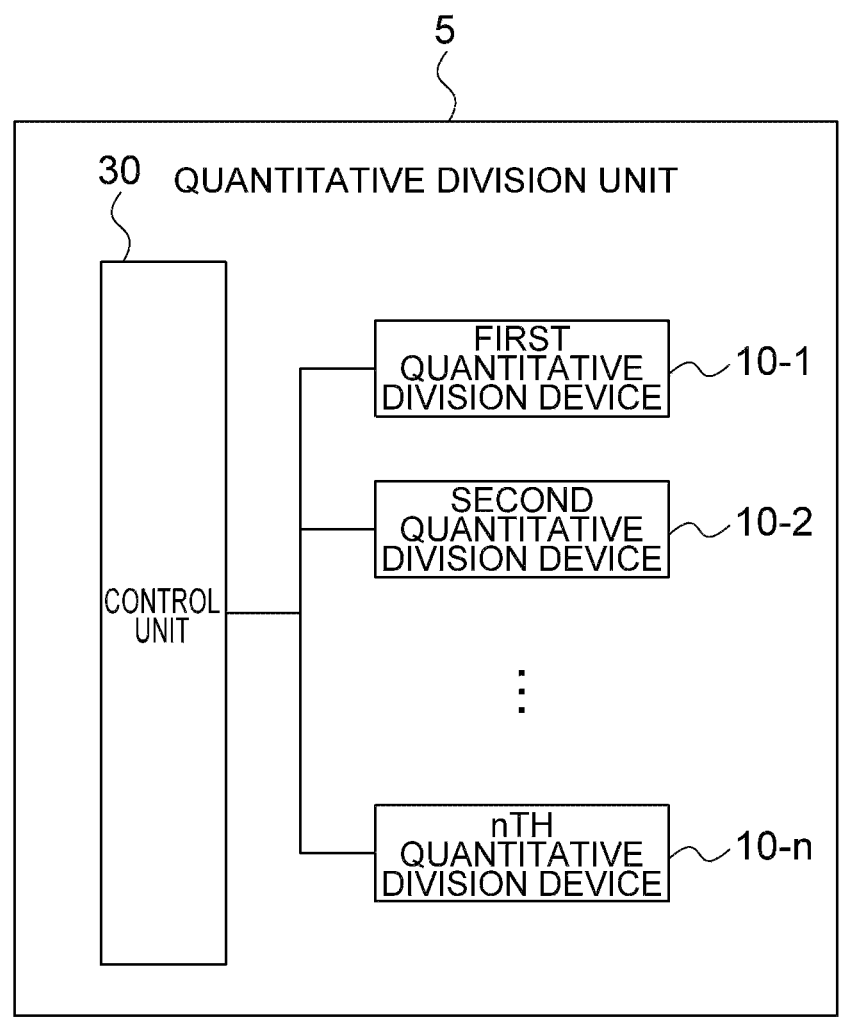
FIG. 15 is a block diagram illustrating an example of a configuration of the quantitative division unit.

FIG. 15 is a block diagram illustrating an example of a configuration of the quantitative division unit 5. In a case where a plurality of quantitative division devices (i.e., first quantitative division device 10-1, second quantitative division device 10-2, . . . , nth quantitative division device 10-n (where n is integer equal to or larger than 2)) are provided, each of the plurality of the quantitative division devices may be connected to the control unit 30. In this case, the plurality of the quantitative division devices can be driven in association with each other under the control of the control unit 30.

Figure 16:
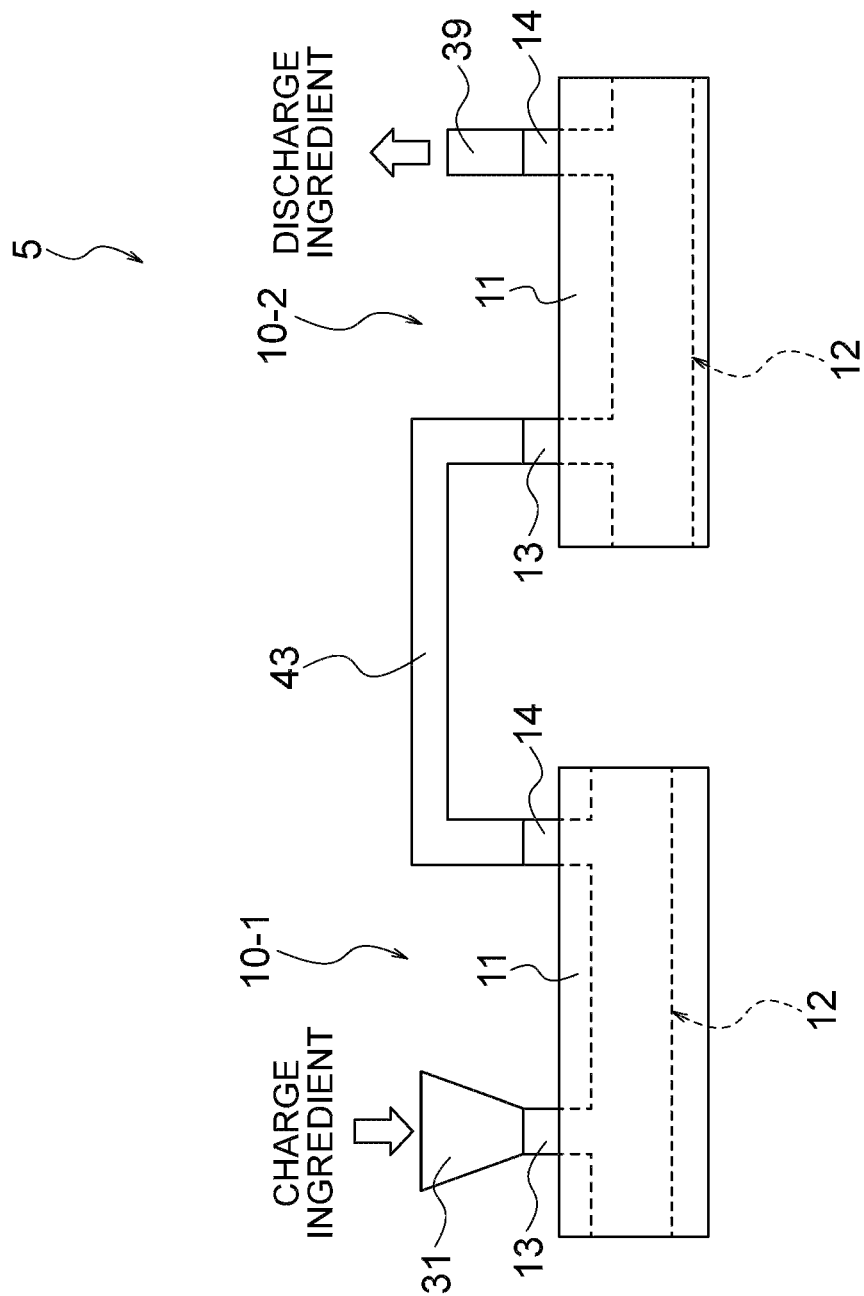
FIG. 16 is an external view illustrating an example of a schematic configuration of the quantitative division unit.

FIG. 16 is an external view illustrating an example of a schematic configuration of the quantitative division unit 5. The second port 14 of the first quantitative division device 10-1 among the plurality of quantitative division devices may be connected to the first port 13 of the second quantitative division device 10-2. For example, as illustrated in FIG. 16, the second port 14 of the first quantitative division device 10-1 may be connected to the first port 13 of the second quantitative division device 10-2 via a relay pipe 43, and the paste ingredient 100 discharged from the second port 14 of the first quantitative division device 10-1 may be introduced to the first port 13 of the second quantitative division device 10-2 via the relay pipe 43. In this case, the operation of discharging the paste ingredient 100 from the second port 14 of the first quantitative division device 10-1 and the operation of introducing the paste ingredient 100 from the first port 13 of the second quantitative division device 10-2 to the internal space 12 are performed in association with each other (for example, simultaneously), so that the paste ingredient 100 can be smoothly fed from the first quantitative division device 10-1 to the second quantitative division device 10-2. As the plurality of the quantitative division devices are driven in association with each other under the control of the control unit 30 as described above, the paste ingredient 100 can be fed over a relatively long distance.

Application Example

The quantitative division unit 5, quantitative division device 10, and quantitative division method described above can be applied to various food production devices, food production systems, and food production methods.

For example, ingredients (that is, paste ingredient 100) used for foods such as spring rolls, hamburgers, croquettes, processed minced fish (for example, deep-fried balls of fish paste), tofu processed foods (for example, fried tofu with vegetables), Japanese sweets (for example, Japanese pancakes with filling), waffles (for example, Harajuku Dog (registered trademark)), various batters, steamed meat dumplings, and gyoza can be properly quantitatively divided by the quantitative division unit 5, the quantitative division device 10, and the quantitative division method described above. The paste ingredient 100 divided by the quantitative division unit 5, the quantitative division device 10, and the quantitative division method described above can be used in various food production devices, food production systems, and food production methods.

Figure 17:
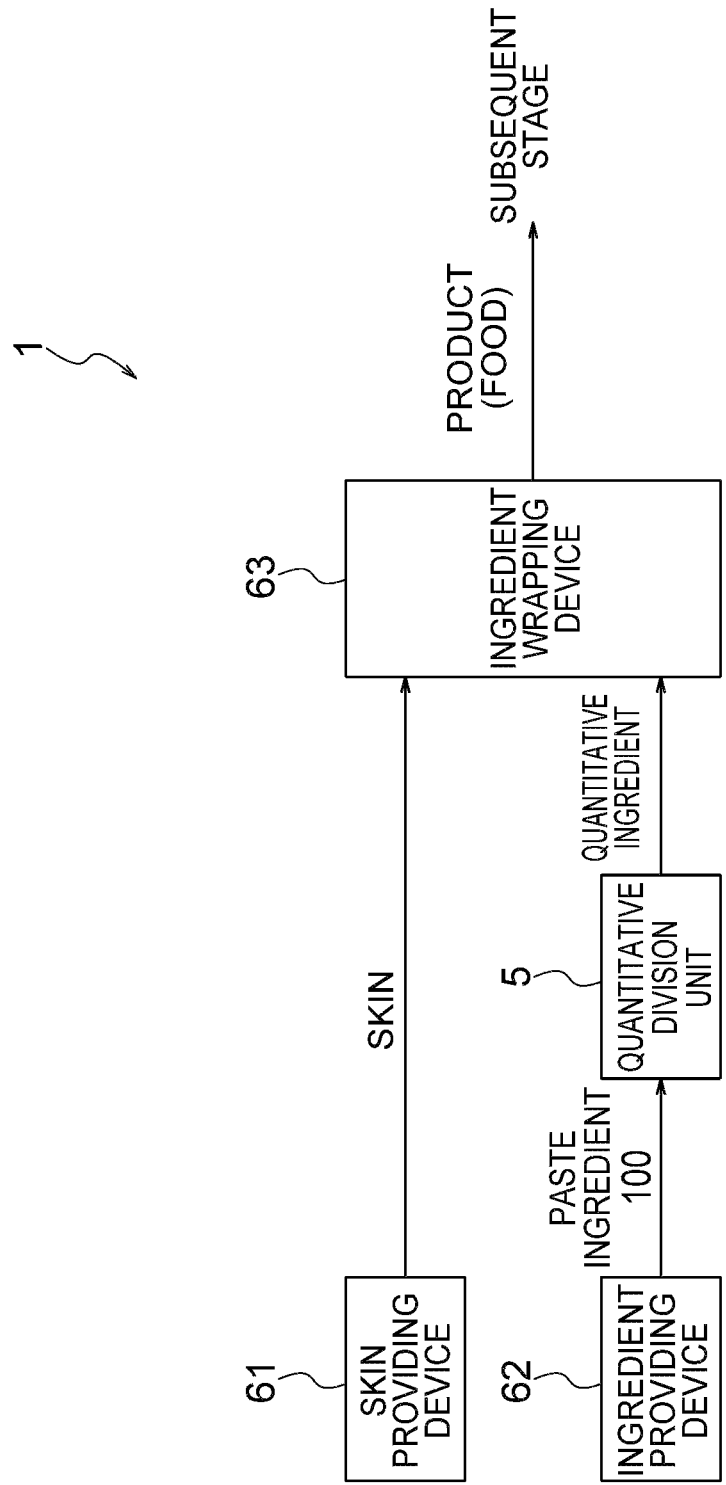
FIG. 17 is a block diagram illustrating an example of a food production system.

FIG. 17 is a block diagram illustrating an example of the food production system 1. The food production system 1 illustrated in FIG. 17 includes a skin providing device 61, an ingredient providing device 62, and an ingredient wrapping device 63, in addition to the quantitative division unit 5 described above.

The skin providing device 61 is a device for preparing a skin for wrapping the ingredient (paste ingredient 100), and the prepared skin is fed from the skin providing device 61 to the ingredient wrapping device 63 by a transport device such as a conveyor. The specific configuration and function of the skin providing device 61 are not limited. For example, the skin providing device 61 may produce and shape a skin (cutting, or the like), may only shape a skin made in advance, or simply feed a skin shaped in advance to the ingredient wrapping device 63 in a desired condition. Further, the skin providing device 61 may perform other processes, for example, various pre-treatments on skins.

The ingredient providing device 62 is a device that prepares the paste ingredient 100 to be wrapped in a skin, and the prepared paste ingredient 100 is fed from the ingredient providing device 62 to the quantitative division unit 5 (in particular, storage portion 31) by a transport device such as a conveyor. The specific configuration and function of the ingredient providing device 62 are not limited. For example, the ingredient providing device 62 may cut and mix the ingredients, may only mix the ingredients that have been cut in advance, or may simply feed the premixed ingredients as the paste ingredient 100 to the quantitative division unit 5 in a desired condition. Further, the ingredient providing device 62 may perform other processes, for example, various pre-treatments on the ingredients (paste ingredient 100).

The quantitative division unit 5 divides the paste ingredient 100 fed from the ingredient providing device 62 according to the quantitative division method described above. The paste ingredient 100 quantitatively divided by the quantitative division unit 5 is fed as a quantitative ingredient from the quantitative division unit 5 to the ingredient wrapping device 63 by a transport device such as a conveyor.

The ingredient wrapping device 63 performs a process of wrapping the paste ingredient 100 fed from the quantitative division unit 5 in a skin fed from the skin providing device 61 to produce a product (food). The product produced by the ingredient wrapping device 63 is fed to a subsequent stage by a transport device such as a conveyor, and various processes are performed in the subsequent stage as needed.

The food production system 1 illustrated in FIG. 17 is only an example, and in the food production system 1, any device can be combined with the quantitative division unit 5 and the quantitative division device 10 described above. Further, any process can be combined with the quantitative division method described above in the food production method. For example, in the food production system 1 and the food production method that produce foods that do not require skins, the skin providing device 61 (that is, providing skins) and the ingredient wrapping device 63 (that is, process of wrapping ingredient in skin) are unnecessary. Further, when the paste ingredient 100 is manually supplied directly to the quantitative division unit 5 (for example, storage portion 31), the ingredient providing device 62 is unnecessary. Furthermore, the food production system 1 can include a device that shapes the paste ingredient 100, a device that heats, cools, and/or freezes the paste ingredient 100, and the like, if necessary. In this way, one or a plurality of any devices can be provided in a previous stage and/or a subsequent stage of the quantitative division unit 5.

As described above, with the quantitative division device 10, the quantitative division unit 5, the food production system 1, the quantitative division method, and the food production method that have been described above, the paste ingredient 100 can be quantitatively divided with high accuracy. In particular, since a gear pump is not used in the quantitative division device 10, the paste ingredient can be quantitatively divided while the damage of the ingredient is prevented. When the first plunger 15 includes the cutter portion 32, the paste ingredient 100 from the first port 13 is cleanly cut by the sharp cutter portion 32 without being excessively crushed, so that the paste ingredient 100 can be quantitatively divided without impairing the food texture more than necessary.

Further, as a negative pressure is generated in the area between the first plunger 15 and the second plunger 16, the paste ingredient 100 can be introduced into the internal space 12 of the peripheral wall portion 11, so that the quantitative division device 10 does not have to include a pressure pump. For this reason, the device configuration can be simplified, and the load of operations at the start and end of production can be reduced, for example, the time required for preparing for the operation such as assembling the device, disassembling the device, and cleaning the device can be reduced.

In this way, the operating efficiency can be increased and the productivity of the entire system can be improved accordingly. Further, the device and method of the present embodiment that are highly convenient and have excellent cleaning performance are not only excellent in hygiene, but also can improve the durability and reliability of the device. Furthermore, it is possible to achieve the space-saving design of the quantitative division unit 5 and the quantitative division device 10, and it is also possible to install the quantitative division unit 5 and the quantitative division device 10 in a limited space.

Although the quantitative division unit 5 and the quantitative division device 10 according to each of the embodiments described above do not include a pressure pump for introducing the paste ingredient 100 into the internal space 12 of the peripheral wall portion 11, the quantitative division unit 5 and the quantitative division device 10 according to each of the embodiments of the present invention may include such a pressure pump. For example, the quantitative division device 10 according to each of the embodiments described above may include a pressure pump that pressurizes the paste ingredient 100 in the first port 13 toward the internal space 12 of the peripheral wall portion 11. In this case, the negative pressure generated in the area between the first plunger 15 and the second plunger 16, which has been described above, and the pressing force due to the pressure pump are combined to more reliably and quickly introduce the paste ingredient 100 to the internal space 12 of the peripheral wall portion 11.

Further, according to the operation of the first plunger 15 and the second plunger 16, a series of processes including the introduction of the paste ingredient 100 into the internal space 12 of the peripheral wall portion 11, the quantitative division of the paste ingredient 100, and the discharge of the paste ingredient 100 from the internal space 12 can be performed smoothly and at high speed.

The present invention is not limited to the embodiments and modifications described above. For example, various modifications may be made to each element of the embodiments and modifications described above. In addition, embodiments including constituent elements and/or methods other than the constituent elements and/or methods described above are also included in the embodiments of the present invention. Further, embodiments that do not include some of the constituent elements and/or methods described above are also included in the embodiments of the present invention. Furthermore, embodiments that include some constituent elements and/or methods included in one embodiment of the present invention and some constituent elements and/or methods included in another embodiment of the present invention are also included in the embodiments of the present invention. Consequently, the constituent elements and/or methods included in each of the embodiments and modifications described above and the embodiments of the present invention other than the ones described above may be combined, and the embodiments related to such combinations are also included in the embodiments of the present invention. Further, the effects achieved by the present invention are not limited to the effects described above, and specific effects according to the specific configuration of each embodiment can also be achieved. As described above, various additions, changes, and partial deletions can be made to each element described in the claims, the specification, the abstract and the drawings without departing from the technical idea and purpose of the present invention.

REFERENCE SIGNS LIST 1 food production system
5 quantitative division unit
10 quantitative division device
10-1 first quantitative division device
10-2 second quantitative division device
10-$n$ nth quantitative division device
11 peripheral wall portion
11a inner wall surface
12 internal space
13 first port
14 second port
15 first plunger
15a end portion
16 second plunger
16a end portion
20 drive unit
21 first plunger drive unit
21a first air cylinder tube
21b first air cylinder rod
22 second plunger drive unit
22a second air cylinder tube
22b second air cylinder rod
23 first coupling drive unit
23a first coupling drive tube
23b first coupling drive rod
23c first coupling portion
24 second coupling drive unit
24a second coupling drive tube
24b second coupling drive rod
24c second coupling portion
25 common coupling drive unit
25a common air cylinder tube
25b common air cylinder rod 30 control unit
31 storage portion
31a feed device
32 cutter portion
33 receiving portion
36 seal member
38 sensors
39 discharge pipe
40 contact surface
43 relay pipe
61 skin providing device
62 ingredient providing device
63 ingredient wrapping device
100 paste ingredient
101 viscous ingredient
102 linear ingredient
D1 first direction

The invention claimed is:

1. A quantitative division unit comprising a quantitative division device that feeds a predetermined amount of a paste ingredient, wherein the quantitative division device comprises:
a peripheral wall portion that has a hollow shape and includes an internal space extending in a first direction, a first port via which outside communicates with the internal space, and a second port via which outside communicates with the internal space and which is provided at a position different from the first port in terms of the first direction,
a first plunger and a second plunger that are arranged to face each other in the first direction in the internal space and that are provided to be movable in the first direction, and
a drive unit that moves the first plunger and the second plunger in the first direction,
the drive unit configured to
i) move at least one of the first plunger and the second plunger to shift the first plunger and the second plunger from a first driving state where the first plunger and the second plunger are arranged in such a manner that a space or a contact surface between the first plunger and the second plunger is located at a position facing the first port, to a second driving state where the first plunger and the second plunger are separated from each other, so as to introduce the paste ingredient between the first plunger and the second plunger via the first port due to a negative pressure generated in an area of the internal space between the first plunger and the second plunger,
ii) move the first plunger and the second plunger to shift the first plunger and the second plunger from the second driving state to a third driving state where at least a part of the paste ingredient between the first plunger and the second plunger is disposed to face the second port while the first plunger is kept separated from the second plunger, and
iii) move at least one of the first plunger and the second plunger to bring the first plunger and the second plunger close to each other to shift the first plunger and the second plunger from the third driving state to a fourth driving state where the first plunger and the second plunger are arranged in such a manner that the space or the contact surface between the first plunger and the second plunger is located at a position facing the second port, so as to feed the paste ingredient between the first plunger and the second plunger to outside via the second port.

2. The quantitative division unit as defined in claim 1, further comprising a storage portion that is connected to the first port and stores the paste ingredient, wherein
the storage portion and the first port are configured so that when the first plunger and the second plunger is shifted from the first driving state to the second driving state, the paste ingredient stored in the storage portion is affected by the negative pressure without being pressurized toward the first port to be introduced between the first plunger and the second plunger via the first port.

3. The quantitative division unit as defined in claim 1, wherein:
the first plunger and the second plunger are configured so that when the first plunger and the second plunger is shifted from the second driving state to the third driving state, an end portion of the first plunger on a side of the second plunger passes at least a portion of the internal space facing the first port to cut the paste ingredient, and in the third driving state, the first port is entirely covered by the first plunger.

4. The quantitative division unit as defined in claim 3, wherein:
the first plunger has a cutter portion that projects toward the second plunger in at least a part of an outer peripheral portion of an end portion of the first plunger on a side of the second plunger,
the second plunger has a receiving portion that has a recessed shape matching a shape of the cutter portion at an end portion of the second plunger on a side of the first plunger, and
the cutter portion engages with the receiving portion in each of the first driving state and the fourth driving state.

5. The quantitative division unit as defined in claim 1, wherein:
the paste ingredient contains an amorphous viscous ingredient having fluidity and a linear ingredient mixed with the viscous ingredient, and
the first plunger and the second plunger are configured so that when the drive unit shifts the first plunger and the second plunger from the first driving state to the second driving state, the drive unit sets a movement amount of one of the first plunger and the second plunger to be larger than a movement amount of the other.

6. The quantitative division unit as defined in claim 5, wherein when the drive unit shifts the first plunger and the second plunger from the first driving state to the second driving state, the drive unit does not substantially move one of the first plunger and the second plunger while moving only the other.

7. The quantitative division unit as defined in claim 1, wherein the drive unit includes:
a first plunger drive unit that moves the first plunger in the first direction; and
a second plunger drive unit that moves the second plunger in the first direction.

8. The quantitative division unit as defined in claim 7, wherein:
the first plunger drive unit is coupled to the first plunger,
the second plunger drive unit is coupled to the second plunger,
the drive unit further includes:
a first coupling drive unit that is coupled to the first plunger drive unit and moves the first plunger and the first plunger drive unit in the first direction in an integrated manner, and a second coupling drive unit that is coupled to the second plunger drive unit and moves the second plunger and the second plunger drive unit in the first direction in an integrated manner, both the first coupling drive unit and the second coupling drive unit are configured by a single common coupling drive unit, and the common coupling drive unit moves the first plunger, the first plunger drive unit, the second plunger, and the second plunger drive unit in the first direction in an integrated manner.

9. The quantitative division unit as defined in claim 1, wherein:

a plurality of quantitative division devices are provided, and the second port of a first quantitative division device among the plurality of quantitative division devices is connected to the first port of a second quantitative division device among the plurality of quantitative division devices.

10. A quantitative division unit comprising a quantitative division device that feeds a predetermined amount of a paste ingredient, wherein the quantitative division device comprises:

a peripheral wall portion that has a hollow shape and includes an internal space extending in a first direction, a first port via which outside communicates with the internal space, and a second port via which outside communicates with the internal space and which is provided at a position different from the first port in terms of the first direction, a first plunger and a second plunger that are arranged to face each other in the first direction in the internal space and that are provided to be movable in the first direction, and a drive unit configured to move the first plunger and the second plunger in the first direction, the drive unit configured to i) move at least one of the first plunger and the second plunger to shift the first plunger and the second plunger from a first driving state where the first plunger and the second plunger are arranged in such a manner that a space or a contact surface between the first plunger and the second plunger is located at a position facing the first port, to a second driving state where the first plunger and the second plunger are separated from each other, so as to introduce the paste ingredient between the first plunger and the second plunger via the first port due to a negative pressure generated in an area of the internal space between the first plunger and the second plunger, ii) move the first plunger and the second plunger to shift the first plunger and the second plunger from the second driving state to a third driving state where at least a part of the paste ingredient between the first plunger and the second plunger is disposed to face the second port while the first plunger is kept separated from the second plunger, and iii) move at least one of the first plunger and the second plunger to bring the first plunger and the second plunger close to each other to shift the first plunger and the second plunger from the third driving state to a fourth driving state where the first plunger and the second plunger are arranged in such a manner that the space or the contact surface between the first plunger and the second plunger is located at a position facing the second port, so as to feed the paste ingredient between the first plunger and the second plunger to outside via the second port, wherein the drive comprises a first plunger drive unit configured to move the first plunger in the first direction, a second plunger drive unit configured to mover the second plunger in the first direction, a first coupling drive unit that is coupled to the first plunger drive unit to move the first plunger and the first plunger drive unit in the first direction in an integrated manner, and a second coupling drive unit that is coupled to the second plunger drive unit to move the second plunger, the second plunger drive unit in the first direction in an integrated manner, and a single common coupling drive unit, and both the first coupling drive unit and the second coupling drive unit are configured to be moved by the single common coupling drive unit, so that the common coupling drive unit moves the first plunger, the first plunger drive unit, the second plunger, and the second plunger drive unit in the first direction in an integrated manner.

* * * * *